United States Patent [19]

Takeshima et al.

[11] Patent Number: 5,388,406
[45] Date of Patent: Feb. 14, 1995

[54] NOX DECREASING APPARATUS FOR AN INTERNAL COMBUSTION ENGINE

[75] Inventors: Shinichi Takeshima, Susono; Satomi Seto, Gotenba; Shinya Hirota, Susono, all of Japan

[73] Assignee: Toyota Jidosha Kabushiki Kaisha, Toyota, Japan

[21] Appl. No.: 118,700

[22] Filed: Sep. 10, 1993

Related U.S. Application Data

[63] Continuation of Ser. No. 967,599, Oct. 28, 1993, abandoned.

[30] Foreign Application Priority Data

Oct. 29, 1991 [JP] Japan .................. 3-308245
Aug. 18, 1992 [JP] Japan .................. 4-219145

[51] Int. Cl.⁶ .............................. F01N 3/20
[52] U.S. Cl. ...................... 60/297; 60/288; 60/301; 60/311; 422/169; 423/212
[58] Field of Search ............ 60/288, 301, 311; 422/169; 423/212

[56] References Cited

U.S. PATENT DOCUMENTS

| | | |
|---|---|---|
| 3,795,730 | 3/1974 | Kalvinskas . |
| 4,944,273 | 7/1990 | Baresel et al. ............... 123/703 |
| 4,985,210 | 1/1991 | Minami ...................... 60/311 |
| 5,184,462 | 2/1993 | Schatz ....................... 60/311 |

FOREIGN PATENT DOCUMENTS

| | | |
|---|---|---|
| 0503882 | 9/1992 | European Pat. Off. . |
| 53-115687 | 10/1978 | Japan . |
| 61-112715 | 5/1986 | Japan . |
| 62-106826 | 5/1987 | Japan . |
| 64-30643 | 2/1989 | Japan . |
| 3-135417 | 6/1991 | Japan . |
| 3928760 | 3/1990 | Netherlands . |

OTHER PUBLICATIONS

"67th CATSJ Meeting Abstracts: No. A9", Partial Catalyst, vol. 33, No. 2, 1991, by Machida of Kyushu University.

"Formation and Decomposition of $BaCuO_{2.5}$ Prepared from a Mixture of Nitrates", Journal of Solid State Chemistry, 1992, by Machida of Kyushu University.

"NO Removal by absorption into BAO–CuO Binary Oxides", J. Chem. Soc., Chem. Commun., 1990, by Machida of Kyushu University.

Abstract of PCT/JP92/01279 filed Oct. 2, 1992, published Apr. 15, 1993 for *Device for Purifying Exhaust of Internal Combustion Engine.*

Abstract of PCT/JP92/01330 filed Oct. 13, 1992, published Apr. 29, 1993, for *Exhaust and Purification Device for Interanl Combustion Engine.*

*Primary Examiner*—Douglas Hart
*Attorney, Agent, or Firm*—Kenyon & Kenyon

[57] ABSTRACT

In an exhaust purification apparatus of an internal combustion engine having an NOx absorption and release material in an exhaust conduit, a heater is provided close to the NOx absorption and release material. When an NOx absorption operation continues for a predetermined period, the heater is switched on to raise the temperature of the NOx absorption and release material above a predetermined temperature, for example, 500° C. When the temperature of the NOx absorption and release material is high, the NOx absorption and release material releases absorbed NOx and is regenerated.

27 Claims, 16 Drawing Sheets

TIMER 2 : $SNe \leftarrow 0$, $Fds \leftarrow 0$
AFTER TEN SECONDS SINCE ON OF TIMER 2

TIMER 1: SNe←0、Fdg←0、Fd←0、HEATER OFF AFTER TWENTY SECONDS SINCE ON OF TIMER 1

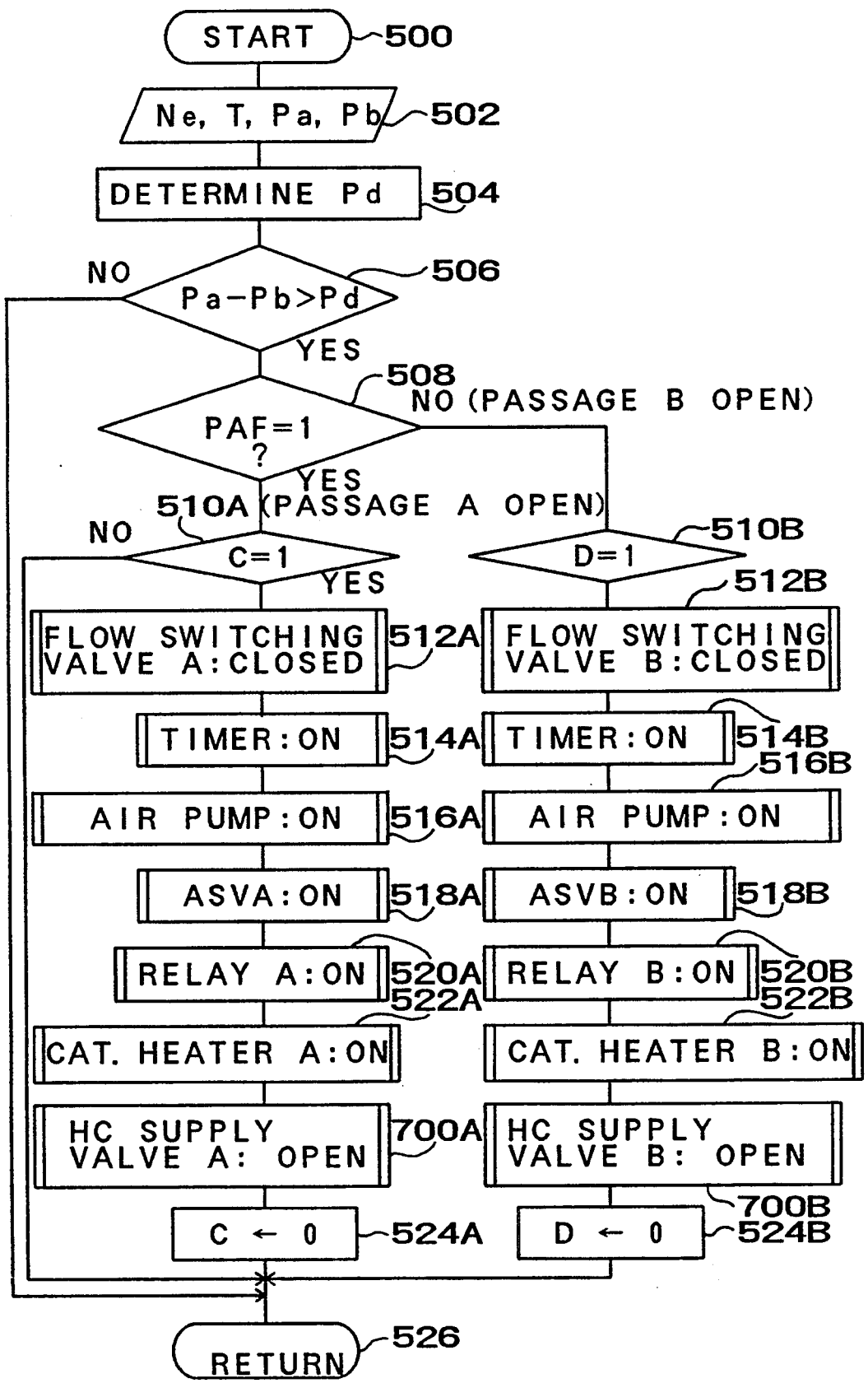

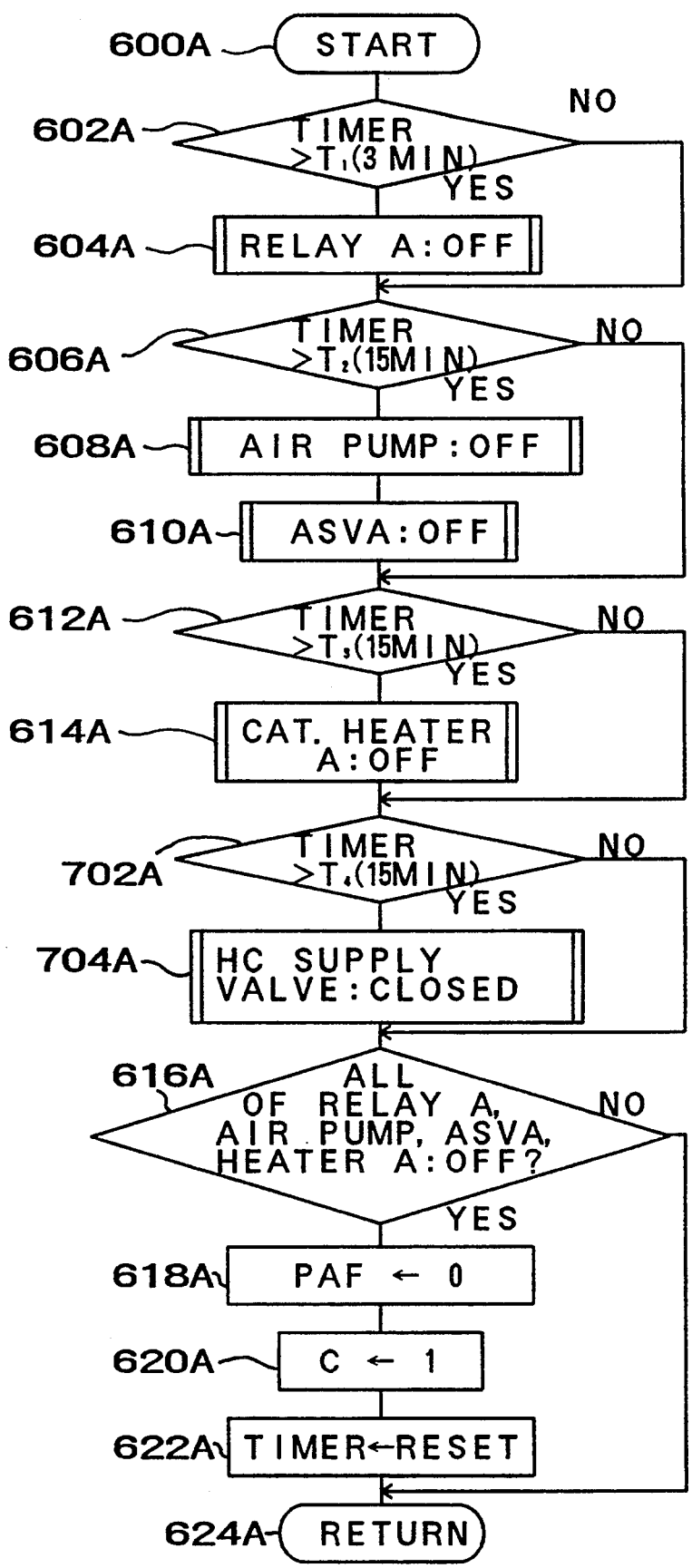

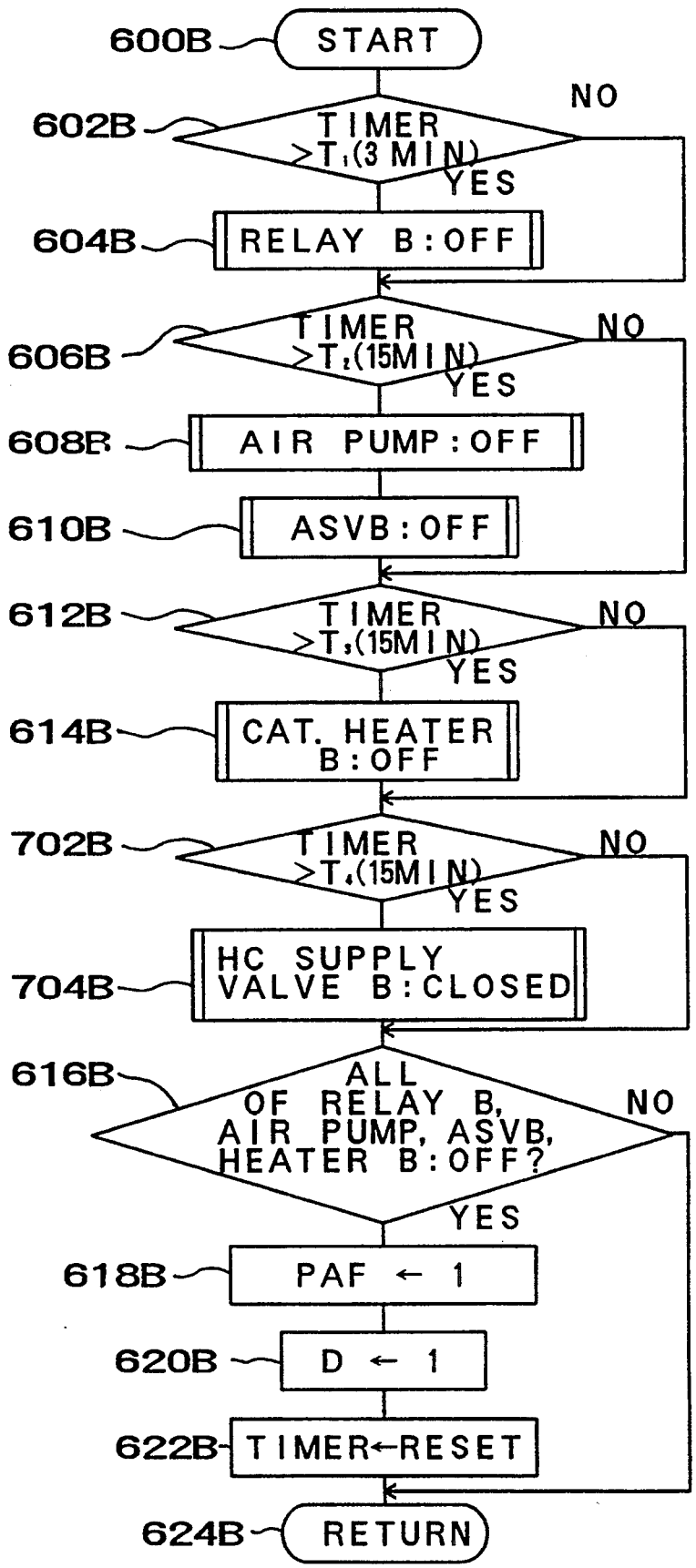

NOX DECREASING APPARATUS FOR AN INTERNAL COMBUSTION ENGINE

This application is a continuation of application Ser. No. 07/967,599, filed Oct. 28, 1993, now abandoned.

BACKGROUND OF THE INVENTION

1. Field of the Invention

The present invention relates to a nitrogen oxides (NOx) decreasing apparatus for an internal combustion engine. More particularly, the present invention relates to an apparatus for effectively purifying NOx included in exhaust gas from a lean burn engine, using a combination of an NOx absorption and release material and an NOx purification catalyst.

2. Description of the Prior Art

To improve fuel economy and to suppress exhaust of carbon dioxide ($CO_2$) to thereby reduce global warming, engines capable of fuel combustion at lean air-fuel ratios (lean burn engines which include lean burn gasoline engines and diesel engines) are being developed and are partially in actual use. Since a conventional catalyst (three-way catalyst) cannot reduce and purify NOx at lean air-fuel ratios, there is a need to develop a catalyst or system that can purify NOx even at lean air-fuel ratios, that is, under oxidizing gas conditions (excess-oxygen conditions).

As an apparatus capable of purifying NOx under oxidizing gas conditions, the present applicant filed Japanese Patent Application HEI 3-289046 an Oct. 4, 1991, in which an NOx absorption and release material capable of absorbing NOx at lean air-fuel ratios and releasing the absorbed NOx at rich air-fuel ratios is installed in an exhaust conduit of a lean burn engine. The air-fuel ratio of the engine is momentarily changed to a rich air-fuel ratio before the NOx absorption and release material is saturated so that the NOx absorption and release material is regenerated.

However, NOx release operation of the NOx absorption and release material is affected not only by the amount of excess oxygen in the exhaust gas but also by exhaust gas temperature. Therefore, the NOx absorption and release material may release the absorbed NOx at some temperatures even under oxidizing gas conditions. On the other hand, the NOx absorption and release material may release little NOx at other temperatures even at rich air-fuel ratios, and therefore, the NOx release time period may have to be prolonged or the frequency of NOx release may have to be increased, which will be accompanied by degradation of driveability. Further, if it is intended to maintain the NOx absorption and release material at appropriate temperatures from the viewpoint of NOx absorption and release, location of the NOx absorption and release material will be limited and freedom of design will be restricted.

SUMMARY OF THE INVENTION

An object of the invention is to provide an NOx decreasing device for an internal combustion engine where a temperature of an NOx absorption and release material can be controlled intentionally without being restricted by location of the NOx absorption and release material.

The above-described object is achieved by an NOx decreasing apparatus for an internal combustion engine in accordance with the invention, which includes: an internal combustion engine capable of fuel combustion at lean air-fuel ratios; an exhaust conduit connected to the internal combustion engine; an NOx absorption and release material, installed in the exhaust conduit, for absorbing NOx included in exhaust gas from the engine under oxidizing gas conditions at temperatures below a predetermined temperature and releasing the absorbed NOx at temperatures above the predetermined temperature; and a heater installed in the exhaust conduit and operable to heat the NOx absorption and release material to a temperature higher than the predetermined temperature.

In the above-described NOx decreasing apparatus, since the NOx absorption and release material can be heated intentionally by the heater to a temperature above the predetermined temperature, release of NOx from the NOx absorption and release material is executed even though the exhaust gas temperature is low, without being affected by the location of the NOx absorption and release material and the operating condition of the internal combustion engine.

BRIEF DESCRIPTION OF THE DRAWINGS

The above-described object and other objects, features, and advantages of the present invention will become more apparent and will be more readily appreciated from the following detailed description of the preferred embodiments of the invention taken in conjunction with the accompanying drawings, in which

FIG. 17 is a flow chart of control for regeneration start of the NOx decreasing apparatus of FIG. 16;

FIG. 18 is a flow chart of control for regeneration finish and reset of an NOx absorption and release material provided in one conduit of the apparatus of FIG. 16; and FIG. 19 is a flow chart of control for regeneration finish and reset of an NOx absorption and release material provided in another conduit of the apparatus of FIG. 16.

DETAILED DESCRIPTION OF THE PREFERRED EMBODIMENTS

Four preferred embodiments of the invention will be explained with reference to the drawings. FIGS. 1–6 illustrate a first embodiment of the invention: FIGS. 7–11 illustrate a second embodiment of the invention: FIGS. 12–15 illustrate a third embodiment of the invention: and FIGS. 16–19 illustrate a fourth embodiment of the invention.

FIRST EMBODIMENT

Figure 1:
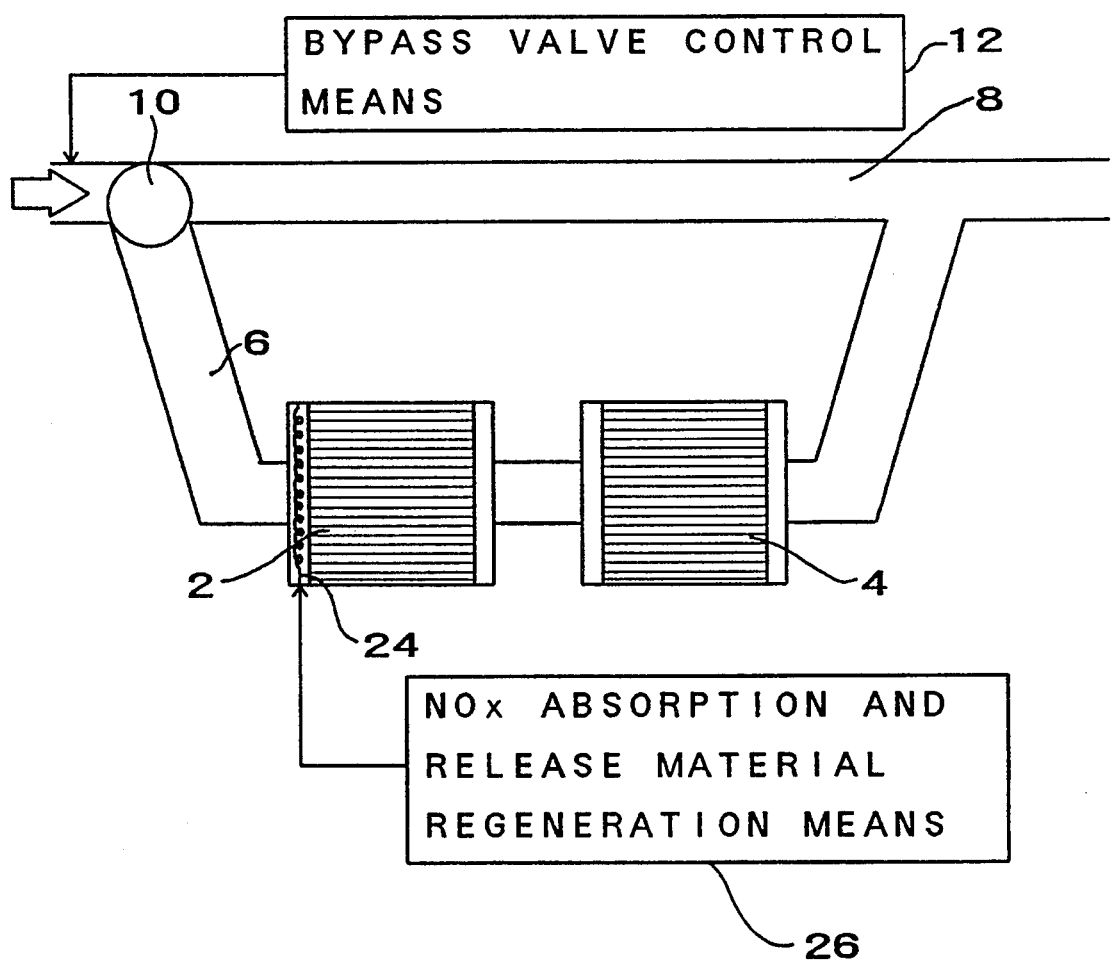
FIG. 1 is a schematic system diagram of an NOx decreasing apparatus for an internal combustion engine in accordance with a first embodiment of the invention.

As illustrated in FIG. 1, an internal combustion engine capable of fuel combustion at lean air-fuel ratios has an exhaust conduit 6. An NOx absorption and release material 2 and an NOx decomposition catalyst 4 are disposed in the exhaust conduit 6 in that order in the direction of exhaust gas flow. An electric heater 24 operable to heat the NOx absorption and release material 2 is located in the exhaust conduit 6. Preferably, the heater 24 is located upstream of and close to the NOx absorption and release material 2. A bypass conduit 8 bypassing the heater 24 and the NOx decomposition catalyst 4 is provided to the exhaust conduit 6. A bypass valve 10 is disposed at a diverging portion of the bypass conduit 8 and the exhaust conduit 6 to permit control of the ratio of the amount of exhaust gas flowing through the NOx absorption and release catalyst to the amount of exhaust gas flowing through the bypass conduit 8.

Switching of the heater 24 between "ON" and "OFF" is controlled by an NOx absorption and release material regeneration means 26. Operation of the bypass valve 10 is controlled by a bypass valve control means 12. When the NOx absorption and release material 2 has continuously absorbed NOx for a predetermined time period, the heater 24 is switched to "ON" to heat the NOx absorption and release material 2. When the temperature T of the NOx absorption and release catalyst has exceeded a predetermined temperature T0, the bypass valve 10 throttles the exhaust gas flowing through the NOx absorption and release material 2 and the NOx decomposition catalyst 4 for a predetermined period, for example, ten seconds.

Figure 2:
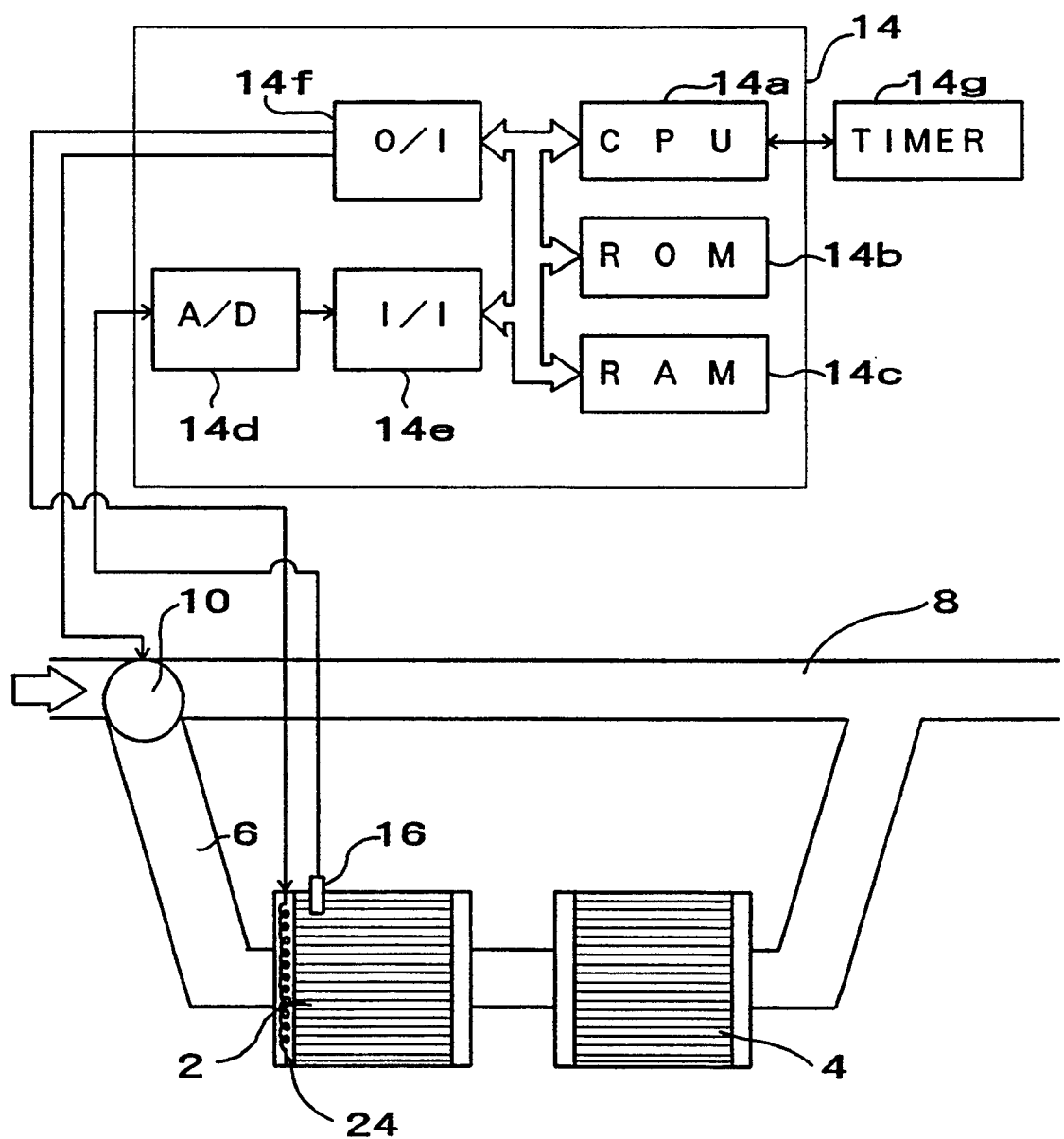
FIG. 2 is a more detailed system diagram of the apparatus of FIG. 1.

FIG. 2 illustrates the system in more detail. In FIG. 2, an electronic control unit (ECU) 14 is constituted by a micro computer. The NOx absorption and release material regeneration means 26 and the bypass valve control means 12 comprise means defined in programs (see FIGS. 3 and 4) stored in the ECU 14. The ECU 14 includes a central processor unit (CPU) 14a for executing calculations, a read-only memory (ROM) 14b, a random access memory (RAM) 14c, an analog/digital converter 14d for converting analog signals to digital signals, an input interface 14e, and an output interface 14f. A timer (described later) 14g is connected to the ECU 14.

In the exhaust conduit 6, an exhaust gas temperature sensor (or an NOx absorption and release material temperature sensor) 16 is installed in a portion of the exhaust conduit 6 downstream of the heater 24. The output of the sensor 16 is fed to the analog/digital converter 14d and is used as an exhaust gas temperature T in calculation. The results of the calculation executed at the CPU 14a are sent via the output interface 14f to the heater 24 and an actuator of the bypass valve 10 so that the heater 24 and the bypass valve 10 are controlled.

Figure 5:
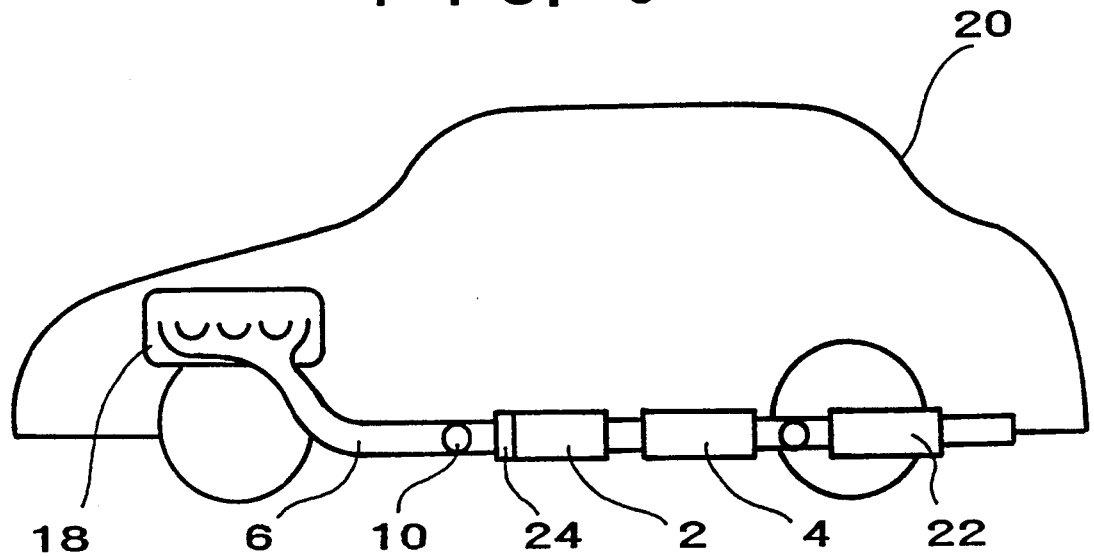
FIG. 5 is a schematic side elevational view of a vehicle mounting the NOx decreasing apparatus of FIG. 1.

The NOx absorption and release material 2 is disposed in a portion of the exhaust conduit where the exhaust gas temperature is lower than 500° C. Such an exhaust conduit portion is usually spaced apart from the engine 18 and is located under a floor of a vehicle 20, as shown in FIG. 5. A member denoted with reference numeral 22 is a muffler.

The NOx absorption and release material 2 comprises a material capable of absorbing NOx included in exhaust gas at temperatures below a predetermined temperature (for example, 500° C.) and releasing absorbed NOx at temperature above the predetermined temperature. Such an NOx absorption and release material comprises a composite oxide of alkali earth and copper (Ba—Cu—O base), or a combination of rare-earth element and noble metal. The composite oxide of alkali earth and copper is, for example, $MnO_2 \cdot BaCuO_2$, and the combination of rare-earth element and noble metal is, for example, a combination of lanthanum (La) and platinum (Pt). The Ba—Cu—O base NOx absorption and release material converts NO into $NO_2$ at temperatures below about 500° C. and can absorb stably the converted $NO_2$ in the crystal structure of the NOx absorption and release material. The Ba—Cu—O base NOx absorption and release material 2 loses its NOx absorption ability at temperatures above about 500° C. and releases absorbed NO which the NOx absorption and release material 2 has absorbed for several hours, within a short period of time, for example, ten seconds.

The Ba—Cu—O base NOx absorption and release material 2 is produced by the following methods:

Production method 1 (Pt carried):

Equal moles of copper nitrate and barium nitrate were mixed and the mixture was calcined in air at 650° C for four hours. Then, the resulting sinstered mixture was placed into 8-platinum nitrate solution so that platinum was deposited onto the sintered mixture. Then, the platinum-coated mixture was roasted at 500° C. in a flow of nitrogen.

Production method 2 (cerium carried):

Equal moles of copper nitrate and barium nitrate were mixed and the mixture was calcined in air at 650° C. for four hours. This sintered mixture was placed into cerium nitrate solution so that cerium was deposited onto the mixture. Then, the cerium-coated mixture was roasted at 500° C in a flow of air.

Formation into a monolith:

Powder of one of the above-described roasted mixtures, silica-sol, and water were mixed at a ratio of 100:100:10 to produce a slurry. A monolith constructed of sintered cordierite was immersed in the slurry and then was taken out of the slurry and was dried in a stream of hot air at 250° C. This coating procedure was repeated several times, and then the coated monolith was roasted at 500° C. to obtain an NOx absorption and release material.

Figure 6:
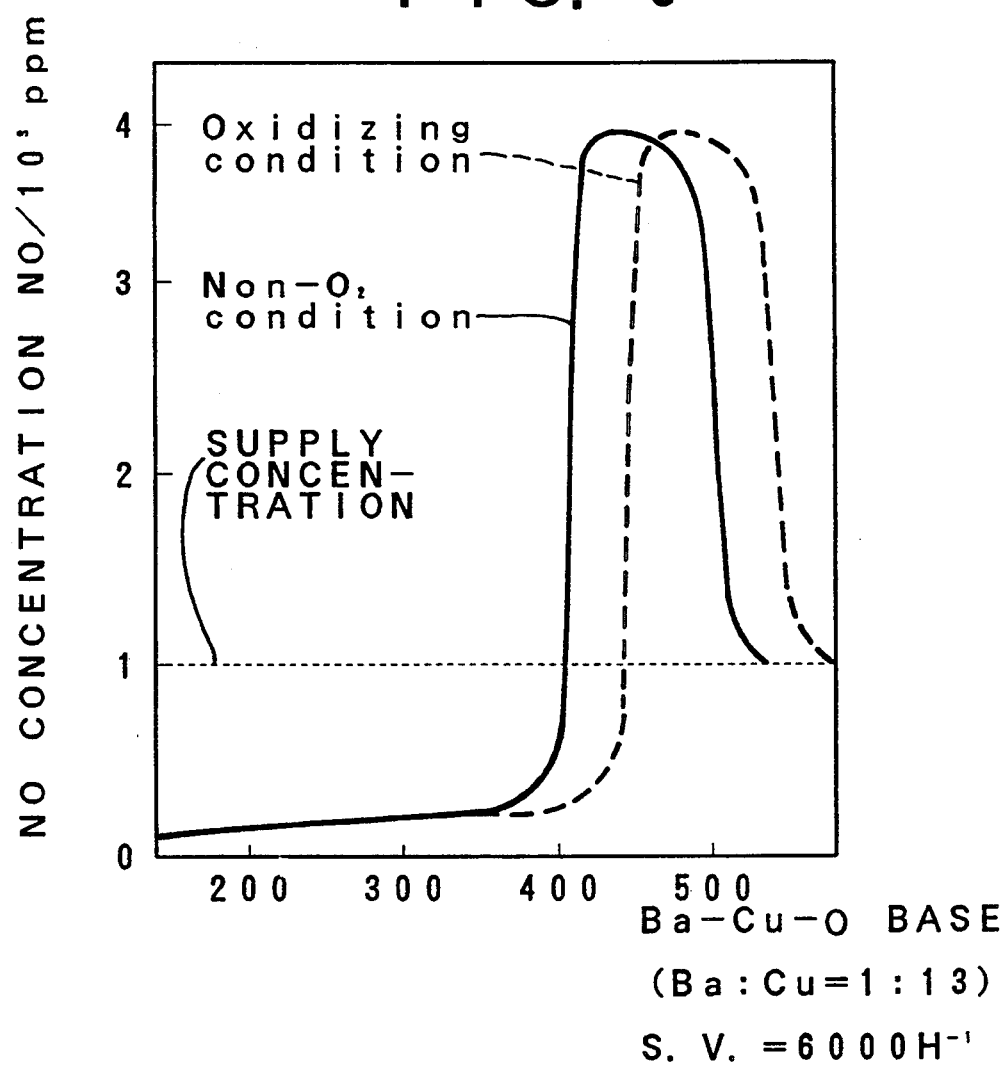
FIG. 6 is a graphical representation of an NOx concentration versus exhaust gas temperature characteristic of the NOx absorption and release material used in the apparatus of FIG. 1.

FIG. 6 illustrates an NOx concentration versus temperature characteristic of the exhaust gas at an outlet of the Ba—Cu—O (Ba: Cu=1: 13) base NOx absorption and release material in a condition of no oxygen (solid line) and at a space velocity or specific volume rate (volumes of exhaust gas per volume of NOx absorption and release material) of 6,000/hour. In the presence of oxygen, the NOx release characteristic shifts by 50°–100° C. toward the right (dashed line) in FIG. 6. From FIG. 6, it is seen that the Ba—Cu—O base NOx absorption and release material releases NOx under oxidizing gas conditions at lean air-fuel ratios above about 500° C., for example, when the heater is switched to "ON", and absorbs NOx at temperatures below about 500° C., for example, when the heater is switched to "OFF". Further, if the air-fuel ratio is changed to a stoichiometric air-fuel ratio or rich ratios, the exhaust gas approaches the non-oxygen condition and the NOx release characteristic shifts to a lower temperature so that NOx release is promoted.

The NOx decomposition catalyst 4 comprises a transition metal/zeolite catalyst, a noble metal/alumina catalyst, or a cobalt/alumina catalyst. The transition metal/zeolite catalyst includes zeolite and a transition metal, for example copper, ion-exchanged and deposited onto the zeolite. The noble metal/alumina catalyst includes a carrier of alumina ($Al_2O_3$) and a noble metal, for example platinum, deposited onto the alumina carrier. The cobalt/alumina catalyst includes an alumina carrier and cobalt deposited onto the alumina carrier. These catalysts can decompose NOx into $N_2$ and $O_2$ at low space velocities in the presence of an appropriate amount of HC, or without HC. The amount of HC should be appropriate, because too much HC would decrease the NOx decomposition rate of the catalyst. Also, the space velocity should be low, because the NOx decomposition rate of the NOx absorption and release material is low at high space velocities. Therefore, when the heater 24 is switched to "ON" and the temperature of the exhaust gas at the NOx absorption and release material is higher than the predetermined temperature T0 (for example, 500° C), the bypass valve 10 should throttle the amount of exhaust gas flowing through the NOx absorption and release material 2 and the NOx decomposition catalyst 4 so that the space velocity at the NOx decomposition catalyst 4 is low.

Figure 3:
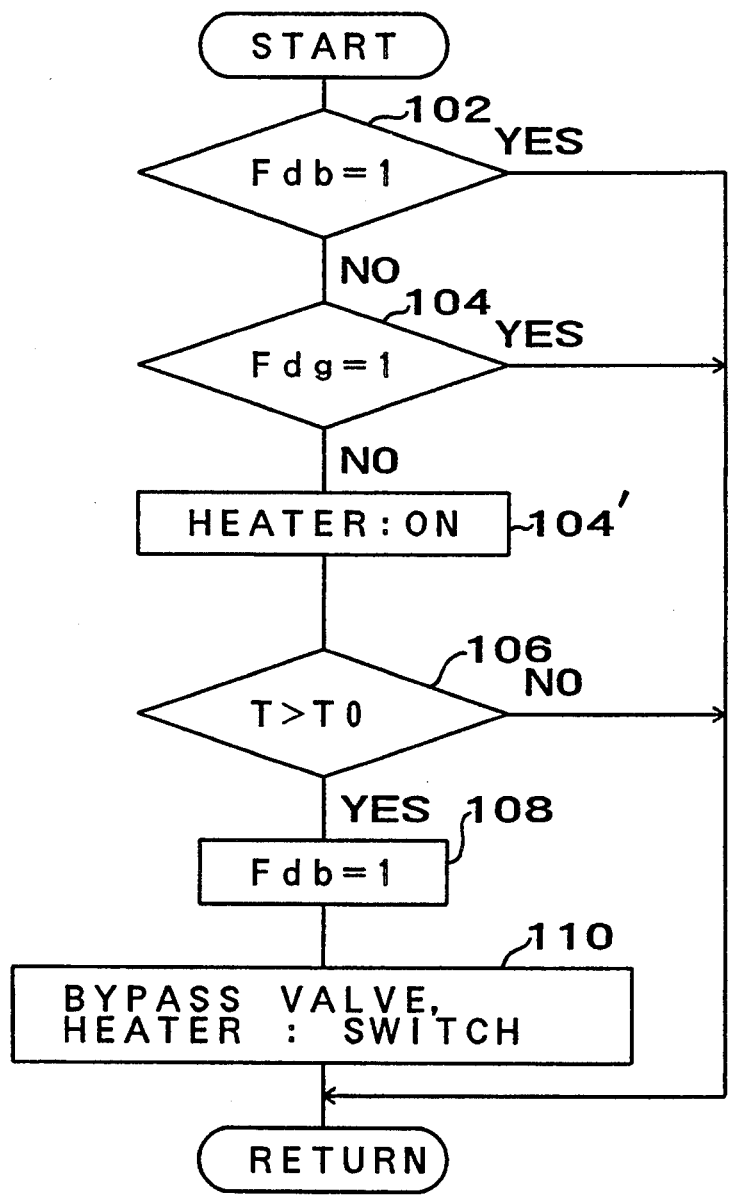
FIG. 3 is a flow chart of regeneration control of an NOx absorption and release material used in the apparatus of FIG. 1.
Figure 4:
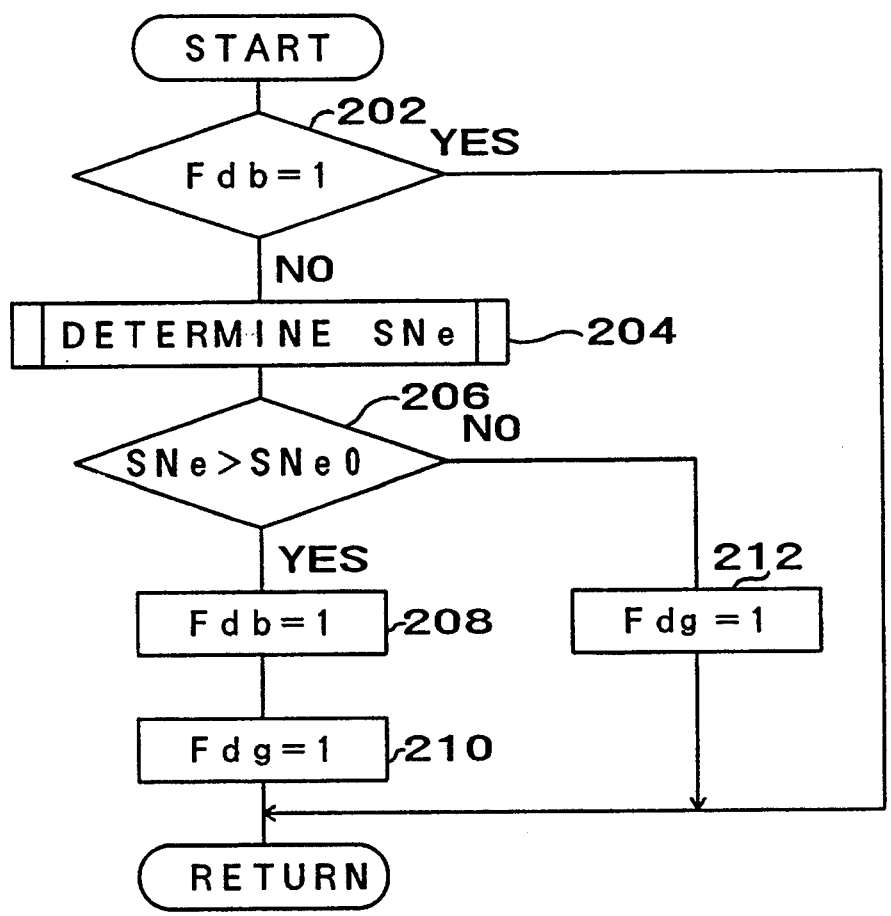
FIG. 4 is a flow chart for controlling various flags so that the routine does not proceed to NOx regeneration steps 104'–110 before a predetermined time period SNe0 has elapsed since regeneration of the NOx absorption and release material.

FIGS. 3 and 4 illustrate control routines for controlling the heater 24 and the bypass valve 10 so that the heater 24 is switched to "ON" to heat the NOx absorption and release material 2 at a predetermined condition and at the same time the bypass valve 10 throttles the amount of exhaust gas flowing through the NOx decomposition catalyst 4 to cause the NOx decomposition catalyst 4 to decompose NOx at a high rate. These routines are stored in the ROM 14b and are entered into the CPU 14a where calculations are executed. The control routines of FIGS. 3 and 4 are entered at intervals of predetermined periods or at every predetermined crank angle.

In the routine of FIG. 3, at step 102 a decision is made as to whether a heater and bypass valve operation flag Fdb is "1" or not. The state that flag Fdb is "1" means that the heater 24 is in an "ON" state and the bypass valve 10 throttles the exhaust gas flowing through the NOx absorption and release material 2 and the NOx decomposition catalyst 4 and causes a large portion of the exhaust gas to flow through the bypass conduit 8. In contrast, the state that flag Fdb is "0" means that the heater 24 is in an "OFF" state and all of the exhaust gas flows through the NOx absorption and release material 2 and the NOx decomposition catalyst 4.

When it is determined at step 102 that flag Fdb is "1", since the heater 24 is in an "ON" state and the bypass valve 10 is in a throttling operation, the heater 24 need not be switched to "ON" and the bypass valve 10 need not be changed in operation to throttle the amount of the exhaust gas flowing through the NOx absorption and release material 2 by causing the routine to proceed through steps 104–110. Thus, the routine proceeds directly to a return step. In contrast, when it is determined at step 102 that flag Fdb is "0", the routine proceeds to step 102 where a decision is made as to whether rotation accumulation flag Fdg is "1" or not. The state that flag Fdg is "1" means that the accumulated engine rotations SNe counted since the last regeneration of the NOx absorption and release material 2 do not exceed a predetermined number of rotations SNe0 and the NOx absorption and release material 2 is not yet saturated. In contrast, the state that flag Fdg is "0" means that SNe is larger than SNe0 and that the NOx absorption and release material 2 is already saturated or is going to be saturated.

When it is determined at step 104 that flag Fdg is "1", since a long period has not elapsed since last release of NOx from the NOx absorption and release material 2, the NOx absorption and release material 2 need not be regenerated, and so the routine proceeds to the return step. In contrast, when it is determined at step 104 that flag Fdg is "0", the routine proceeds to step 104', where the heater 24 is switched to "ON". Then, the routine proceeds to step 106, where a decision is made as to whether or not the exhaust gas temperature (or NOx absorption and release material temperature) T which is raised through heating by the heater 24 exceeds a predetermined temperature T0. T0 is defined as a temperature forming a boundary between an NOx absorption temperature range and an NOx release temperature range, and T0 is about 500° C.

When it is determined at step 106 that T is equal to or smaller than T0, since the NOx absorption and release material 2 has not yet been raised in temperature to an NOx release beginning temperature after the switching-on of the heater 24, the routine proceeds to the return step. In contrast, when it is determined at step 106 that T exceeds T0, the routine proceeds to steps 108 and 110 to control the bypass valve 10 so that the NOx decomposition catalyst 4 decomposes at high decomposition rates the NOx which the NOx absorption and release material 2 begins to release.

Since the heater 24 is in an "ON" state and the bypass valve 10 is in a throttling condition when the routine proceeds through the route including steps 108 and step 110, flag Fdb is set to "1" at step 108. Then, the routine proceeds to step 110, where the bypass valve 10 is switched to throttle the exhaust gas flowing though the NOx absorption and release material 2 and the NOx decomposition catalyst 4, and then the timer 14g is switched on.

The timer 14g is preset to switch off the heater 24, to clear the accumulated rotation SNe to zero, and to reset flag Fdb to "0", after about ten seconds has elapsed since the switching on of the timer 14g. Accordingly, the timer 14g maintains the heater 24 at an "ON" state for about ten seconds after the exhaust gas temperature T exceeds the predetermined temperature T0 subsequent to switching the heater on, so that NOx release from the NOx absorption and release material 2 is completed during the period of about ten seconds. After the period of ten seconds, flag Fdb is cleared and the timer 14g is reset.

In the above-described structure, steps 104 and 104' and the timer 14g constitute the NOx absorption and release material regeneration means 26, and steps 106 and 110 and the timer 14g constitute the bypass valve control means 12.

Following the routine of FIG. 3, a routine of FIG. 4 is entered. The routine of FIG. 4 is a flag control routine for controlling flags Fdb and Fdg so that the heater 24 and the bypass valve 10 are prevented from operation before the NOx absorption and release material 2 is saturated, even though exhaust gas temperature T exceeds the predetermined temperature T0. The routine of FIG. 4 assures that exhaust gas flow through the bypass conduit 8 to atmosphere without being purified will not continue for a long period of time.

More particularly, at step 202, a decision is made as to whether flag Fdb is "1". When it is determined at step 202 that flag Fdb is "0", the routine proceeds to step 204, where the number of engine rotations counted since last regeneration of the NOx absorption and release material 2 is increased by every entry to the routine of FIG. 4. When it is determined at step 202 that Fdb is "1", the routine proceeds directly to a return step.

If Fdb is "0", the routine proceeds from step 202 to 204, and the engine rotation number SNe is accumulated. Then, the routine proceeds to step 206, where a decision is made as to whether the accumulated rotation SNe exceeds the predetermined rotation SNe0. If SNe is equal to or less than SNe0 at step 202, the NOx absorption and release material 2 may be deemed to have not yet been saturated, and the routine proceeds to step 212, where flag Fdg is set to "1". If SNe exceeds SNe0 at step 202, the routine proceeds to steps 208 and 210 where flags Fdb and Fdg are set to "1"in preparation for execution of control according to the routine of FIG. 3.

Operation of the first embodiment will now be explained.

In a standard operation range, all of the exhaust gas flows through the NOx absorption and release material 2 and the NOx decomposition catalyst 4. Since the heater 24 is in an "OFF" state and the exhaust gas temperature at the inlet of the NOx absorption and release material 2 is below about 500° C., NOx included in the exhaust gas is absorbed by the NOx absorption and release material 2. The volume of the NOx absorbing and release material 2 is selected so that the material has enough capacity to continuously absorb NOx included in the exhaust gas for several hours. After continuous operation for several hours and the NOx absorption and release material 2 approaches the saturation, the heater 24 is switched on and the exhaust gas temperature (NOx absorption and release material temperature) increases to above 500° C. at the inlet of the NOx absorption and release material 2. In this high temperature condition, the NOx absorption and release material 2 releases the NOx which had been absorbed, so as to be finally regenerated. During the NOx release period of the NOx absorption and release material 2, the bypass valve 10 throttles the exhaust gas flowing to the NOx decomposition catalyst 4 so that the space velocity at the NOx decomposition catalyst 4 is low and NOx is decomposed into $N_2$ and $O_2$ by the NOx decomposition catalyst 4 at high rates.

Release of absorbed NOx from the NOx absorption and release material 2 is achieved in about ten seconds. During the regeneration of the NOx absorption and release material 2, most of the exhaust gas flows through the bypass conduit 8 and the NOx included in the exhaust gas is exhausted to atmosphere without being decomposed. However, this state continues for only about ten seconds and NOx exhausted during this short period is small, which will cause no problem from the viewpoint of environmental pollution.

The above-described absorption of NOx by the NOx absorption and release material 2 and regeneration of the NOx absorption and release material 2 by operating the heater 24 do not require high exhaust gas temperature, so the location of the NOx absorption and release material can be spaced from the engine. Accordingly, there is increased design freedom for locating the exhaust gas purification system.

SECOND EMBODIMENT

Figure 7:
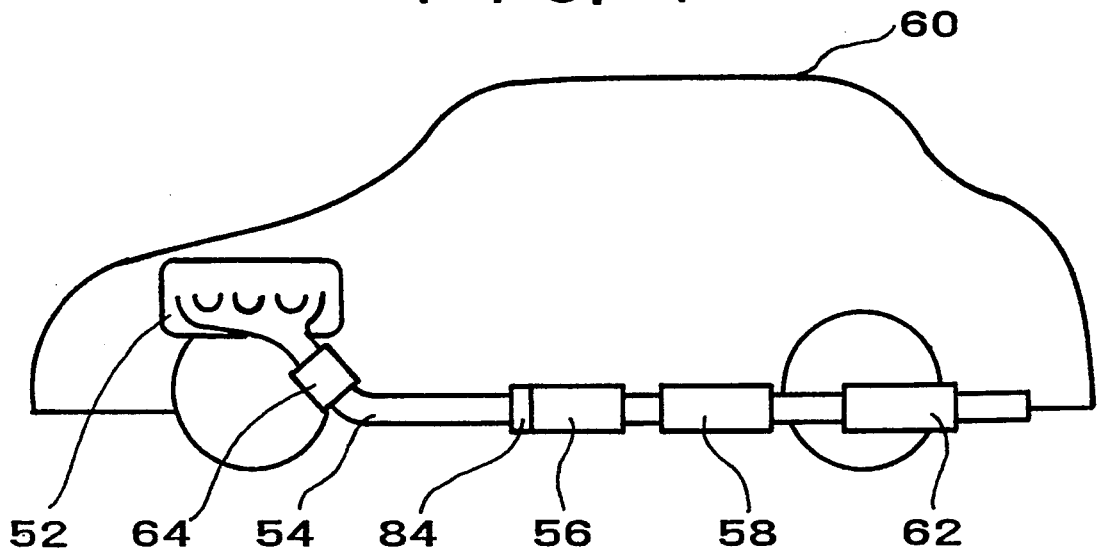
FIG. 7 is a schematic side elevational view of a vehicle mounting an NOx decreasing apparatus for an internal combustion engine in accordance with a second embodiment of the present invention.

As illustrated in FIG. 7, an NOx absorption and release material 56 is installed in an exhaust conduit 54 of an internal combustion engine 52 capable of fuel combustion at lean air-fuel ratios. The exhaust conduit 54 comprises a single conduit. A three-way catalyst 58 may be installed in the exhaust conduit downstream of the NOx absorption and release material 56. Since the NOx absorption and release material 54 should be located in a portion of the exhaust conduit 54 where the exhaust gas temperature is below 500° C., the NOx absorption and release material 54 is located under a floor of a vehicle 60. Preferably, another three-way catalyst 64 is installed in the exhaust conduit between the engine 52 and the NOx absorption and release material 56. The three-way catalyst 64 is located close to the engine 52.

Like the NOx absorption and release material of the first embodiment, the NOx absorption and release material 56 comprises a material capable of absorbing NOx below a predetermined temperature (for example, 500° C.) and of releasing absorbed NOx at temperatures above the predetermined temperature, and comprises, for example, Ba—Cu—O base material.

The three-way catalyst 58 can purify NOx, CO (carbon monoxide), and HC (hydrocarbons) included in exhaust gas at a stoichiometric or rich air-fuel ratio. However, at lean air-fuel ratios, the three-way catalyst 58 cannot purify NOx and can purify CO and HC only.

The three-way catalyst 64 disposed between the engine 52 and the NOx absorption and release material 56 functions as a cold catalyst. More particularly, in a cold period immediately after engine start a large amount of HC is exhausted from the engine. Since the three-way catalyst 58 disposed in a downstream portion of the exhaust conduit has not yet been warmed-up to the activation temperature of about 250° C., the three-way catalyst 58 can not purify the great amount of HC following a cold start. To purify the cold HC, the three-way catalyst 64 is disposed close to the engine so that the three-way catalyst 64 is quickly warmed-up and HC can be purified quickly.

Another reason why the three-way catalyst 64 is preferably provided is to suppress HC degradation of the NOx absorption and release material 56. In tests executed by the inventors, it was found that the larger the amount of HC, the lower is the NOx absorption ability of the NOx absorption and release material 56. This is because even if the NOx absorption and release material converts NO into $NO_2$ to absorb $NO_2$, the converted $NO_2$ is reduced to NO by HC, and NO cannot be absorbed by the NOx absorption and release material 56.

Although the NOx absorption and release material 56 and the three-way catalyst 58 are combined so as to purify NOx, when a lean burn and low temperature operation continues for a long time period, the NOx absorption and release material 56 will finally be saturated and lose its NOx absorption ability. The NOx which has not been purified at the saturated NOx absorption and release material 56 will flow to the three-way catalyst 58, which cannot purify NOx under oxidizing conditions, and then is exhausted as it is to atmosphere. To prevent such a direct exhaust of NOx to atmosphere, the heater control apparatus shown in FIG. 8 and the heater control steps shown in FIGS. 9-11 are provided in the second embodiment of the invention.

Figure 8:
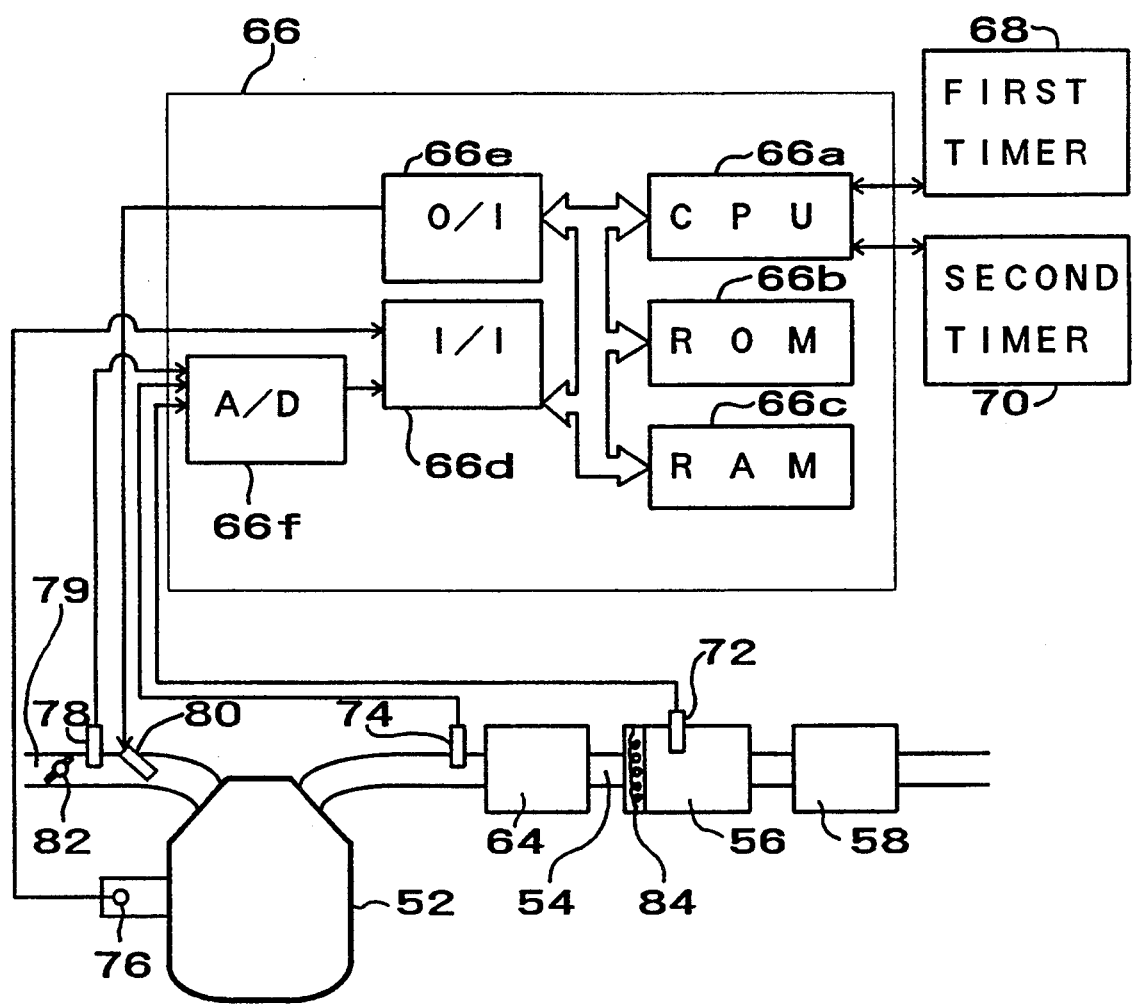
FIG. 8 is a schematic system diagram of the NOx decreasing apparatus of FIG. 7.

In FIG. 8, an electronic control unit (ECU) 66 constituted by a micro computer includes a central processor unit (CPU) 66a, a read-only memory (ROM) 66b, a random access memory (RAM) 66c, an input interface (I/I) 66d, an output interface (I/O) 66e, and an analog/-digital converter (A/D) 66f. A first timer 68 and a second timer 70, which will be described later, are connected to the CPU 66a.

An intake pressure sensor 78 is installed in an intake conduit 79 downstream of a throttle valve 82 and generates an electric signal PM corresponding to an intake pressure PM. A crank angle sensor 76 is housed in a distributor and generates an electric signal which is used for calculation of engine speed NE. In the exhaust conduit 54, an exhaust gas temperature sensor (or NOx absorption and release material temperature sensor) 72 is installed downstream of the heater 84 and generates an electric signal corresponding to the exhaust gas temperature T. An oxygen sensor 74 also is provided in the exhaust conduit. Analog signals among these signals are converted into digital signals by the A/D converter 66f and then fed to the input interface 66d. Digital signals are fed to the input interface 66d as they are. The instructions from the CPU 66a are sent through the output interface 66e to respective members, for example, the heater 84 and a fuel injection valve 80.

Figure 9:
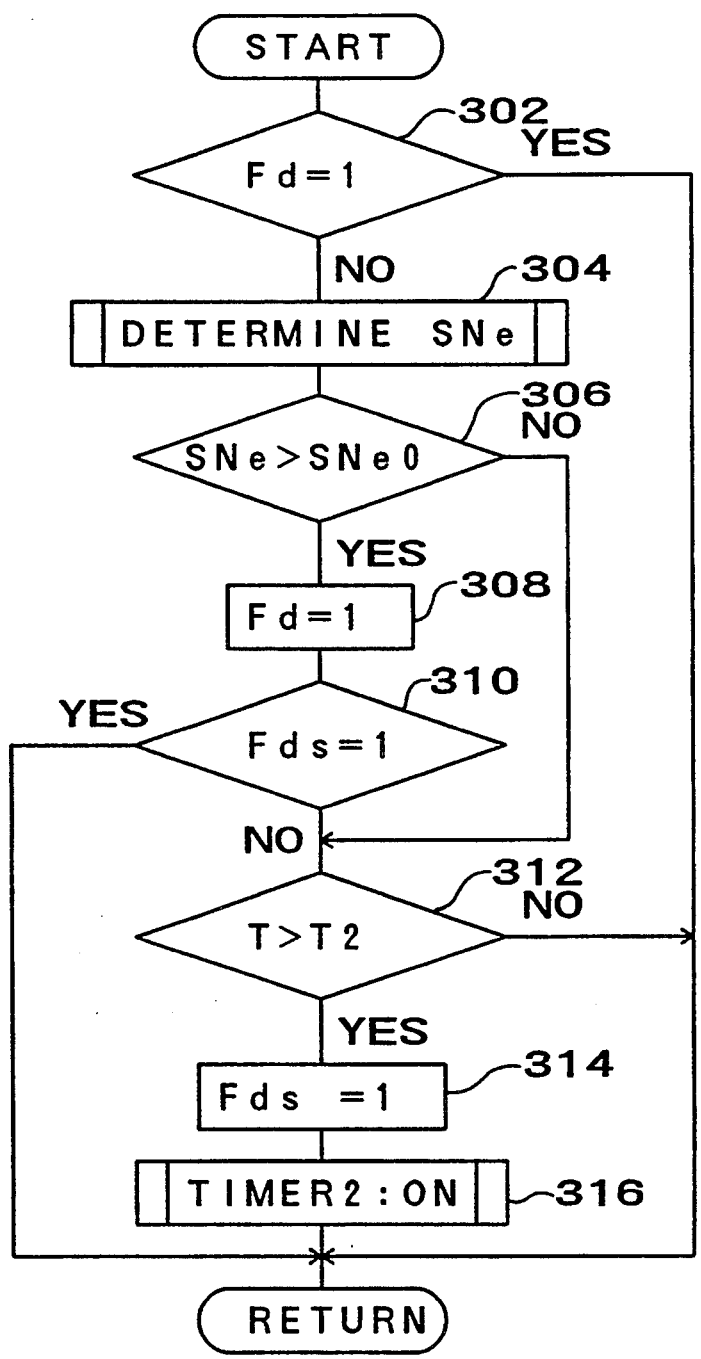
FIG. 9 is a flow chart of control for NOx natural release of the NOx decreasing apparatus of FIG. 8.
Figure 10:
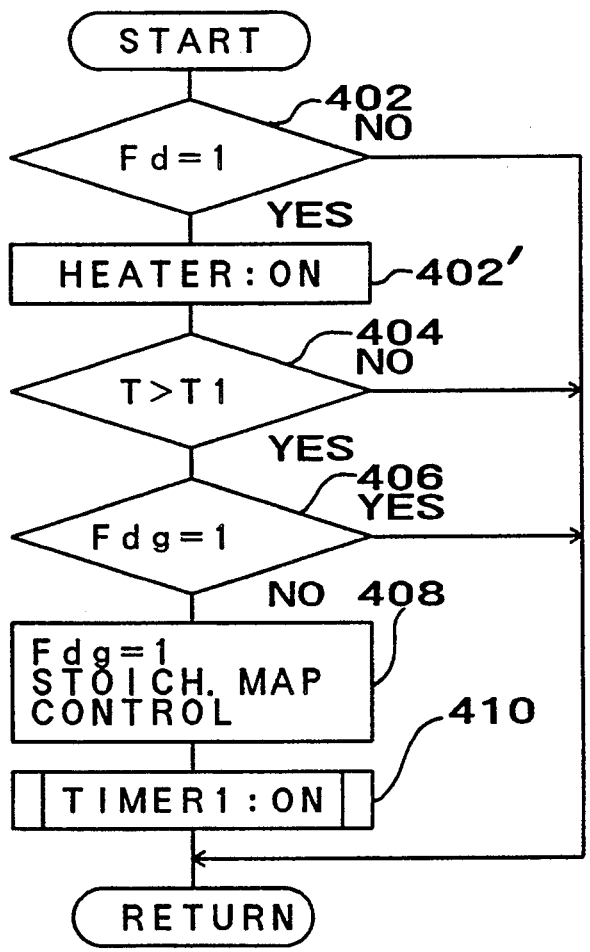
FIG. 10 is a flow chart of control for NOx release of the NOx decreasing apparatus of FIG. 8.
Figure 11:
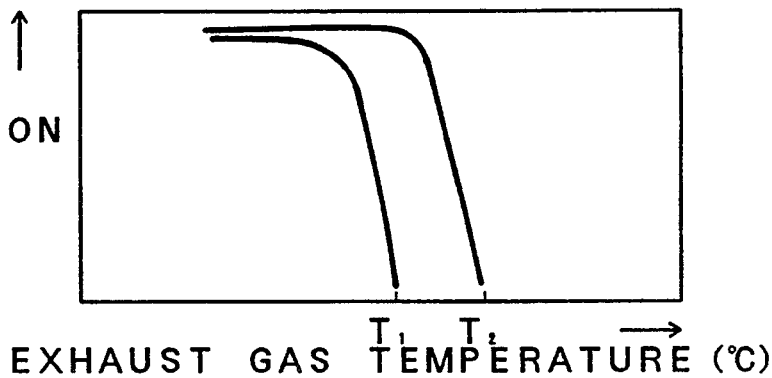
FIG. 11 is a graphical representation of NOx absorption rate versus exhaust gas temperature characteristics of the NOx absorption and release material of the apparatus of FIG. 7 at a lean burn condition and a stoichiometric control condition.

The ROM 66b stores the routines of FIGS. 9 and 10 which are read by the CPU 66a, where control calculation is executed. The routines of FIGS. 9 and 10 control the heater 84 so that when a lean burn condition continues for a first predetermined time period, the heater 84 is switched on and is maintained in an "ON" state for a second predetermined time period. The routines of FIGS. 9 and 10 further control the fuel injector to provide a stoichiometric or rich air-fuel ratio during the "ON" state of the heater.

The control routine of FIG. 9 is entered at predetermined intervals. At step 302, a decision is made as to whether release requirement flag Fd is "1" or not. The state that flag Fd is "1" means the NOx absorption and release material 56 is close to saturation and needs to be regenerated. When flag Fd is "1" at step 302, the routine proceeds to a return step, skipping steps 304–316. In a standard operation, flag Fd is in a "0" state due to step 410 as described later. When flag Fd is "0" at step 302, that is, the NOx absorption and release material 56 is not yet saturated, the routine proceeds to step 304, where a time of a continuing lean burn condition is counted up per every entry to the routine, for example by increasing the accumulated engine rotations.

Then, at step 306, a decision is made as to whether or not the period of continuing lean burn condition, as measured by accumulated engine rotations SNe, finally exceed a predetermined number of rotations SNe0. When SNe exceeds SNe0, it is deemed that NOx absorption ability of the NOx absorption and release material 56 reaches the limit and the NOx absorption and release material 56 must be regenerated. Then, the routine proceeds to step 308 where flag Fd is set to "1". If SNe is smaller than SNe0 at step 306, the routine proceeds to step 312. Since SNe is usually smaller than SNe0, the routine usually proceeds to step 312. In the above-described apparatus, steps 304 and 306 constitute a decision means for determining whether a lean burn condition has continued for a first predetermined time period.

From step 308 the routine proceeds to step 310, where a decision is made as to whether or not flag Fds is "1". The state that flag Fds is "1" means that the NOx absorption and release material is in a natural release condition. When it is determined at step 310 that Fds is "1", the routine proceeds to the return step. If flag Fds is "0" at step 310, the routine proceeds to step 312, where a decision is made as to whether or not the exhaust gas temperature T is higher than a natural release beginning temperature T2 at which the NOx absorption and release material 56 begins to release NOx naturally under oxidizing gas conditions. When T is greater than T2 and the temperature is in a natural release range, the routine proceeds to step 314 where natural release range flag Fds is set to "1", and then the routine proceeds to step 306 where the second timer 70 is switched to "ON". When about ten seconds has elapsed since the switching-on of the second timer 70, SNe is cleared to zero and flag Fds also is cleared to "0". During the period of about ten seconds since the switching-on of the second timer 70, since the NOx absorption and release material 56 is at high temperatures above T2, the NOx absorption and release material 56 continues to release NOx under oxidizing gas conditions, so that the NOx absorption and release material 56 is finally regenerated. If the exhaust gas temperature T is lower than T2 at step 312, the routine proceeds to the return step, skipping steps 314 and 316.

After each completion of the routine of FIG. 9, the routine of FIG. 10 is entered. At step 402, a decision is made as to whether or not release requirement flag Fd is "1". Usually, flag Fd is in a "0" condition due to step 410 which will be described later. If flag Fd is "0" at step 402, the routine proceeds to a return step. In contrast, if flag Fd is "1" at step 402, the routine proceeds to step 402', where the heater 84 is switched on. Then, the routine proceeds to step 404.

At step 404, a decision is made as to whether or not the exhaust gas temperature T is higher than an NOx release beginning temperature T1 at a stoichiometric air-fuel ratio. Before T reaches T1, NOx release does not occur even if the heater 84 is in an "ON" state. Therefore, the routine proceeds to the return step, skipping steps 406, 408, and 410. When T exceeds T1 at step 404, the routine proceeds to step 406, where a decision is made as to whether stoichiometric release flag Fdg is "1" or not. If flag Fdg is "0", the routine proceeds to step 408 so that the air-fuel ratio is controlled to a stoichiometric or rich air-fuel ratio, and flag Fdg is set to "1". If flag Fdg is "1" at step 406, since the engine operation is in the stoichiometric control condition, the routine proceeds to the return step.

From step 408 the routine proceeds to step 410, where the first timer 68 is switched to "ON". The first timer 68 counts a second time period, for example, twenty seconds, and after the second period, clears the accumulated engine rotations number SNe, resets stoichiometric release flag Fdg and release requirement flag Fd, and switches off the heater 84. Then, the routine returns.

In the above-described apparatus, step 402' and the first timer 68 constitute the NOx absorption and release material regeneration means. Further, steps 402, 408, and 10 constitute air-fuel ratio control means for temporarily changing the air-fuel ratio to a stoichiometric or rich air-fuel ratio for a predetermined period set by the first timer 68 (for example, twenty seconds).

Fuel injection control itself is well known. More particularly, a basic fuel injection amount TAU is determined on the basis of an engine load PM and an engine speed NE, and then various modifications are added to the TAU value. To determine TAU on the basis of PM and NE, two maps are stored in the ECU, that is, a lean burn map used for lean burn operation and a stoichiometric map used for stoichiometric operation. The stoichiometric map control of step 408 means that the operation is temporarily changed from the lean burn operation to a stoichiometric operation using the stoichiometric map.

Operation of the second embodiment of the invention will now be explained.

In a lean burn operation, the three-way catalyst 58 cannot reduce NOx. However, since the NOx absorption and release material 56 is located under a vehicle floor, the temperature of the NOx absorption and release material 56 is low, so that NOx included in exhaust gas is absorbed by the NOx absorption and release material 56. As a result, NOx exhaust into the atmosphere is prevented.

When a relatively low speed running condition continues and the NOx absorption and release material 56 has almost been saturated, the heater 84 is switched to "ON" so that the engine is changed to a stoichiometric air-fuel ratio operation where the three-way catalyst 58 can reduce NOx. Since the heater 84 has been switched on, the temperature of the NOx absorption and release material 56 rises and finally exceeds the predetermined temperature, to release absorbed NOx. The released NOx is reduced by the three-way catalyst 58 which is located downstream of the NOx absorption and release material 56.

When it is determined at step 306 that a period of the lean burn operation exceeds a first predetermined period, flag Fd is set to "1" at step 308. Thus, when the routine of FIG. 10 is entered, the routine proceeds to steps 402', 408, and 410, so that the heater 84 is changed to "ON" and the air-fuel ratio is changed to a stoichiometric or rich air-fuel ratio. This condition is maintained for a second time period. As a result, the NOx release characteristic is changed from T2 to T1 in FIG. 11, and the NOx absorption and release material 56 releases NOx and is regenerated. After the regeneration, the operation is returned to a lean burn operation. These cycles are repeated.

THIRD EMBODIMENT

Figure 12:
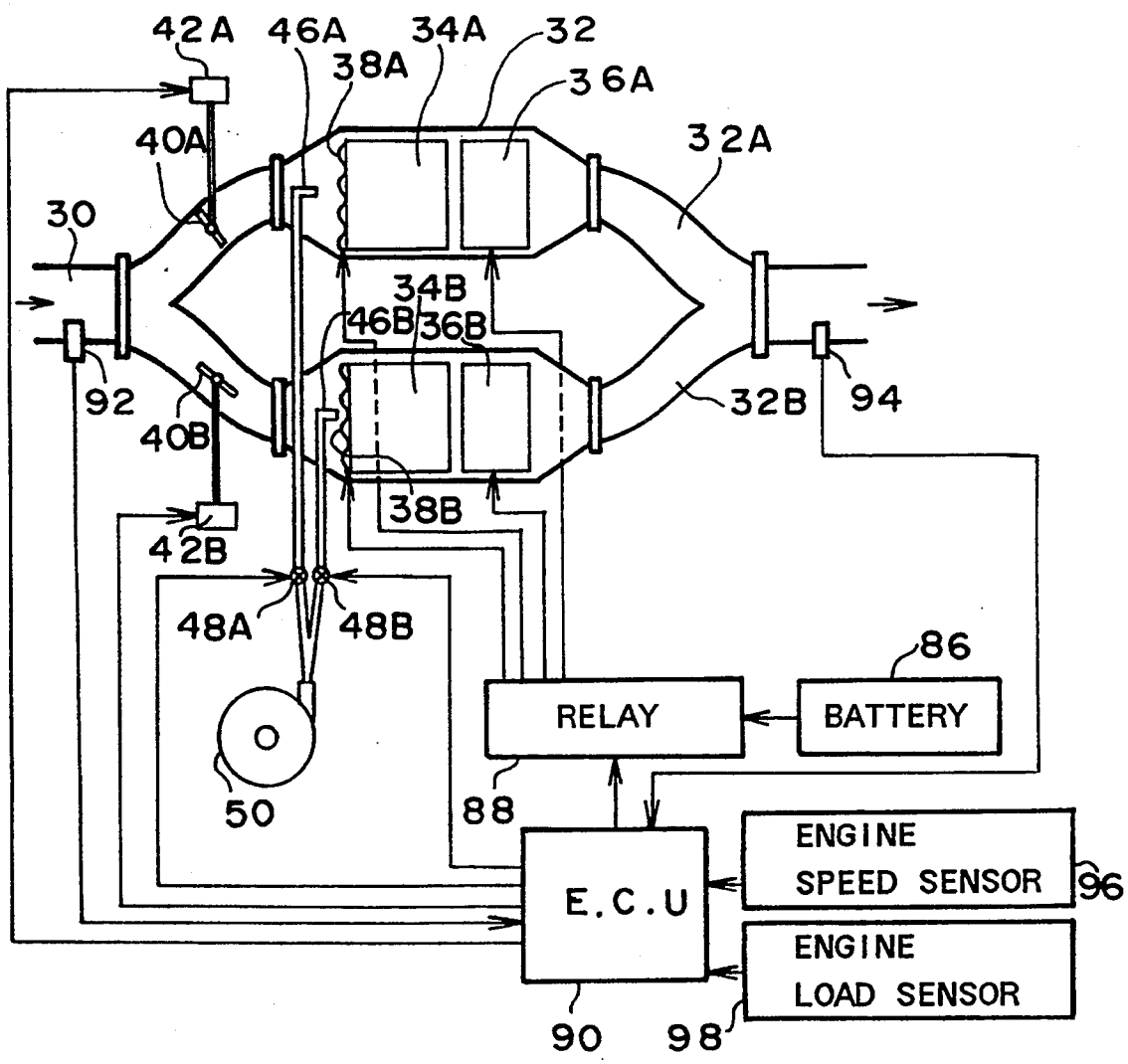
FIG. 12 is a schematic system diagram of an NOx decreasing apparatus for an internal combustion engine in accordance with a third embodiment of the invention.

As illustrated in FIG. 12, an exhaust conduit 30 of a lean burn engine (diesel engine in the third embodiment) includes a dual passage portion 32 having a first passage 32A and a parallel second passage 32B. Diesel particulate filter and NOx absorption and release materials (hereinafter, NOx absorption and release materials) 34A and 34B are disposed in first and second passages 32A and 32B, respectively. Each NOx absorption and release material 34A, 34B functions not only as a diesel particulate filter for capturing diesel particulates but also as an NOx absorption and release material. More particularly, each NOx absorption and release material 34A, 34B absorbs NOx included in exhaust gas from the engine at temperatures below a predetermined temperature and releases absorbed NOx at temperatures above the predetermined temperature.

Each NOx absorption and release material 34A, 34B includes a carrier constituted of alumina which carries at least one kind of material selected from the group consisting of alkali metal including potassium (K), sodium (Na), and lithium (Li); alkali-earth including barium (Ba), cesium (Ce), and calcium (Ca); and rare-earth element including lanthanum (La) and yttrium (Y), and further carries at least one kind of metal selected from the group consisting of noble metals including platinum (Pt) and transition metals including copper (Cu) and iron (Fe). This NOx absorption and release material absorbs NOx when the exhaust gas is in oxidizing gas conditions, and releases NOx when the oxygen concentration of the exhaust gas decreases and/or when the exhaust gas temperature rises to a temperature above the predetermined temperature.

NOx decomposition catalysts 36A and 36B with a heater are disposed in portions of the first and second passages 32A and 32B, respectively, located downstream of the NOx absorption and release materials 34A and 34B. For the NOx decomposition catalysts 36A and 36B, any of the following three kinds of catalysts can be used: a catalyst which is constituted by zeolite ZSM-5 and copper ion-exchanged and deposited onto the zeolite; a catalyst which is constituted by alumina $Al_2O_3$ and Cu deposited onto the alumina; and a catalyst which is constituted by alumina $Al_2O_3$ and platinum or platinum and rhodium deposited onto the alumina.

Electric heaters 38A and 38B are disposed in portions of the first and second passages 32A and 32B, respectively, located upstream of the NOx absorption and release materials 34A and 34B. When the heaters 38A and 38B are switched on, the heaters 38A and 38B burn diesel particulates captured by the NOx absorption and release materials 34A and 34B, and heat the NOx absorption and release material 34A and 34B to a temperature above the predetermined temperature to cause the NOx absorption and release material 34A and 34B to release absorbed NOx. As a result, the NOx absorption and release materials 34A and 34B are regenerated both as a diesel particulate filter and as an NOx absorption material.

Flow switching valves 40A and 40B for switching exhaust gas flow between the first passage 32A and the second passage 32B are disposed in the first and second passages 32A and 32B, respectively, upstream of the heaters 38A and 38B, respectively. The flow switching valves 40A and 40B are driven by actuators 42A and 42B, respectively. When one of the switching valves 40A and 40B is open, the other of the switching valves 40A and 40B is closed.

Secondary air supply ports 46A and 46B for supplying secondary air into the first and second passages 32A and 32B are provided at portions of the first and second passages 32A and 32B located between the switching valves 40A and 40B and the NOx absorption and release materials 34A and 34B. The secondary air supply ports 46A and 46B are connected to an air pump 50 via secondary air conduits in which solenoid valves 48A and 48B for switching on and off supply of secondary air are disposed.

The heaters 38A and 38B provided so as to heat the NOx absorption and release materials 34A and 34B and the heaters provided so as to heat the NOx decomposition catalysts 36A and 36B are connected via an electric circuit to a battery 86 so that electricity is supplied to the heaters, and an electric relay device 88 is provided on the electric circuit so as to selectively switch on and off the heaters.

The switching on and off of the flow switching valves 40A and 40B and the switching on and off of the electric heaters for the NOx decomposition catalysts 38A and 38B are controlled by an electronic control unit (ECU) 90. Like the cases of the first and second embodiments, the ECU 90 includes a CPU, a ROM, a RAM, and input and output interfaces, and analog signals are converted into digital signals by an A/D converter and are fed to the input interface.

A pressure sensor 92 is installed in a portion of the exhaust conduit 30 located upstream of the dual passage portion 32 and another pressure sensor 94 is installed in a portion of the exhaust conduit 30 located downstream of the dual passage portion 32. A differential between outputs of these two pressure sensors 92 and 94 corresponds to the amount of diesel particulates captured by the NOx absorption and release materials 34A and 34B, so that the need for regeneration as a diesel particulate filter can be detected. The outputs of the pressure sensors 92 and 94 are fed to the ECU 90. Output signals of the engine speed sensor 96 and the engine load sensor 98 are also fed to the ECU 90.

Figure 13:
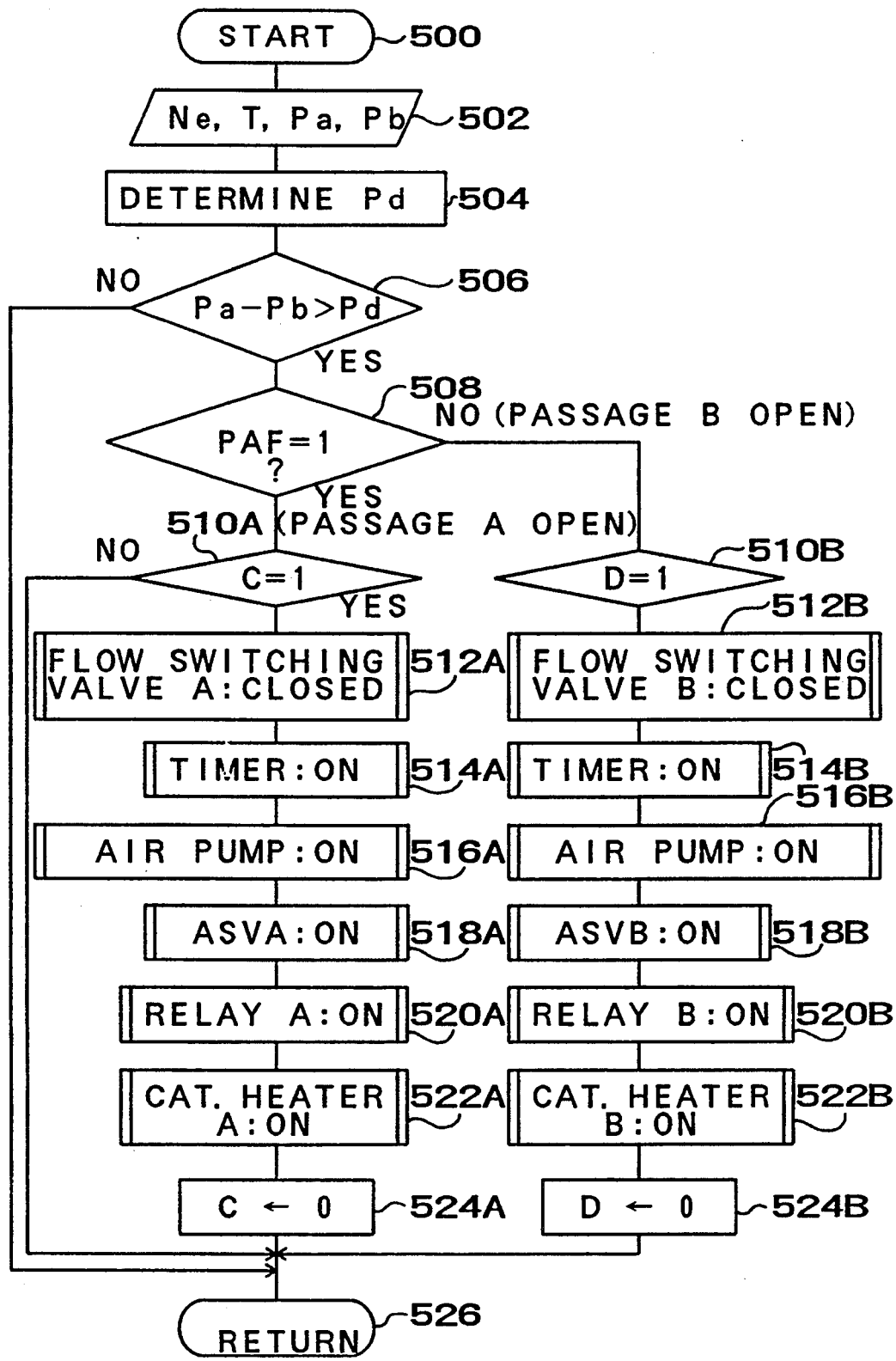
FIG. 13 is a flow chart of control for regeneration start of an NOx absorption and release material of the apparatus of FIG. 12.
Figure 14:
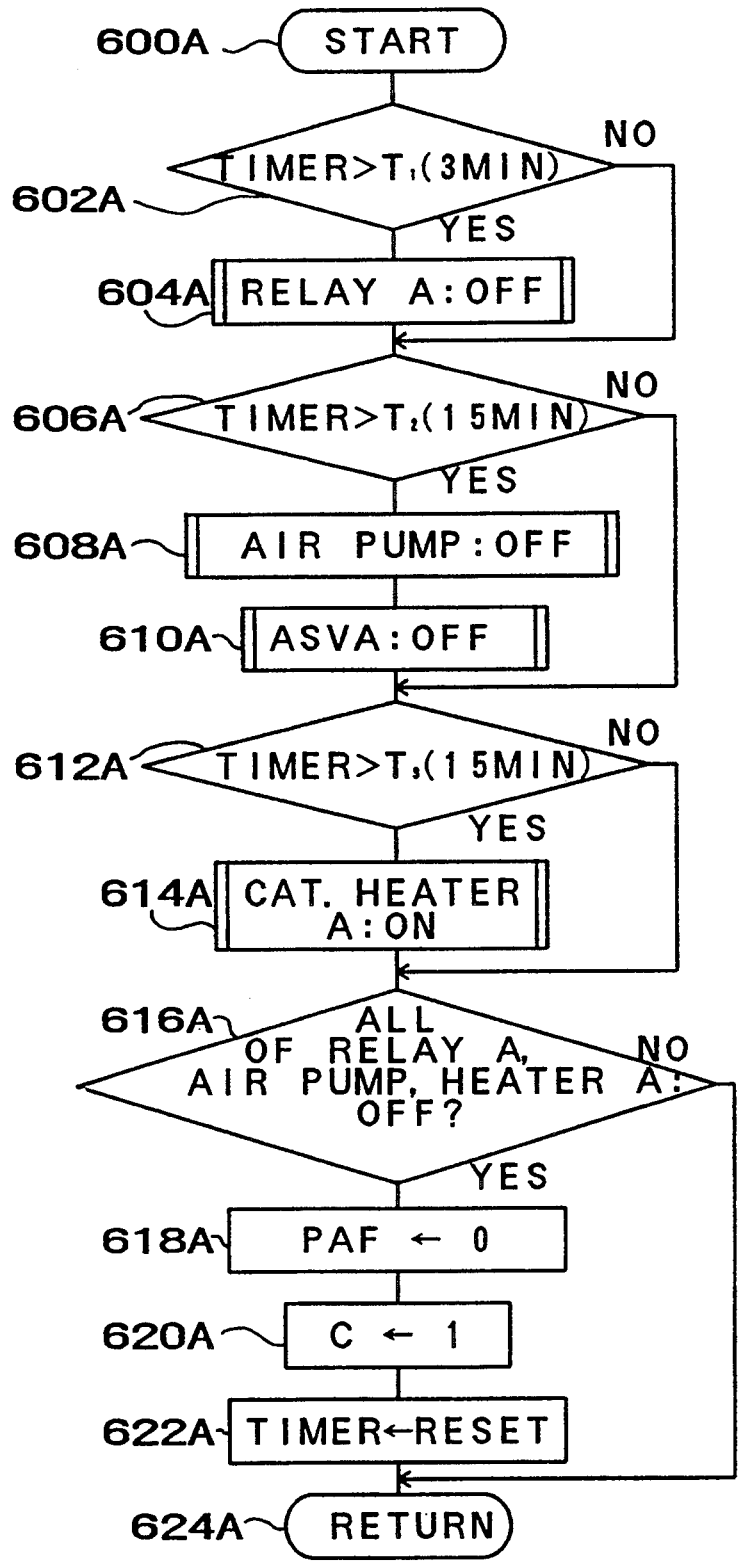
FIG. 14 is a flow chart of control for regeneration finish and reset of an NOx absorption and release material provided in one conduit of the apparatus of FIG. 12.
Figure 15:
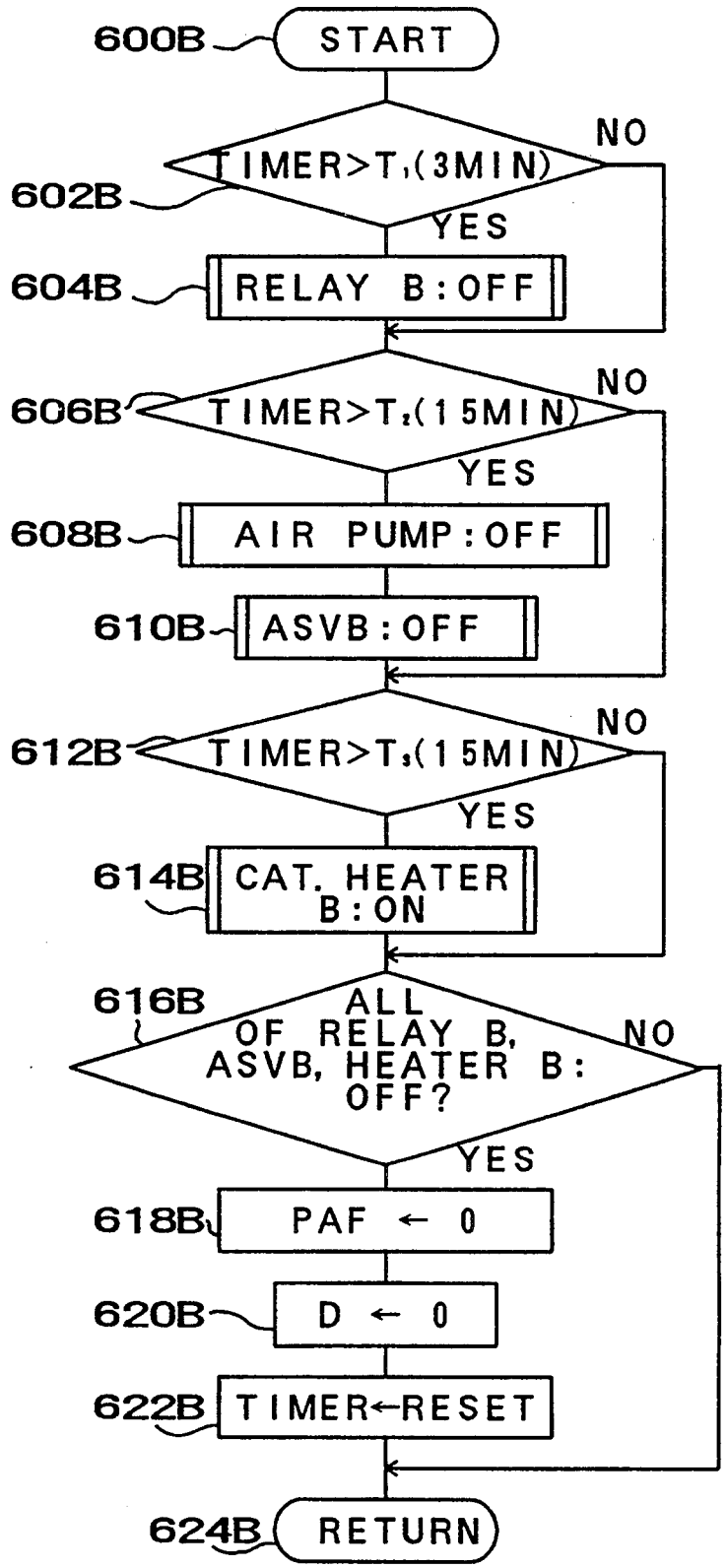
FIG. 15 is a flow chart of control for regeneration finish and reset of an NOx absorption and release material provided in another conduit of the apparatus of FIG. 12.

Control routines of FIGS. 13–15 for controlling the flow switching valves 40A and 40B and heaters 38A and 38B are stored in the ROM, and calculation according to the control routines is executed in the CPU. The routine of FIG. 13 controls beginning regeneration of the NOx absorption and release material, and the routines of FIGS. 14 and 15 control the regeneration operation periods using a timer to perform regeneration and then resetting at optimum timings.

The routine of FIG. 13 is entered at step 500 at intervals of predetermined periods, for example, at every eight milliseconds. Then, at step 502, the current engine speed Ne, the current engine load T (for example, throttle valve opening degree), the current pressure Pa of the pressure sensor 92, and the current pressure Pb of the pressure sensor 94 are entered. Then, at step 504, a predetermined allowable pressure differential Pd between the upstream side and the downstream side of the NOx absorption and release material for the current engine operating condition is determined using a map. Then, at step 506, a decision is made as to whether or not the current pressure differential (Pa−Pb) exceeds the allowable pressure differential Pd. If the actual pressure differential is equal to or smaller than Pd, the NOx absorption and release material need not be regenerated, and so the routine proceeds to a return step. In contrast, if the actual pressure differential exceeds Pd, the routine proceeds to step 508 to regenerate the NOx absorption and release material by burning diesel particulates.

To execute the regeneration, at step 508 a decision is made as to which passage of the first and second passages is open to exhaust gas flow. The condition that passage A flag PAF is "1" means valve 40a is currently open so that the exhaust gas has been flowing through the first passage 32A, and therefore the NOx absorption and release material to be regenerated is the NOx absorption and release material 34A. If it is determined at step 508 that flag PAF is "1", the routine proceeds to step 510A, where a decision is made as to whether or not the current cycle is a first cycle for passing through the route including step 510A. The condition that flag C is "1" corresponds to the first cycle.

When it is determined at step 510A that flag C is "1", the routine proceeds to steps 512A–522A, where regeneration of the NOx absorption and release material 34A begins. More particularly, at step 512A the flow switching valve 40A is closed, at step 514A the timer is switched on, at step 516A the air pump 50 is turned on, and at step 518A the heater of the NOx decomposition catalyst 36A is switched on by operating the relay 88. As a result, the heater 38A burns the particulates to regenerate the NOx absorption and release material. During the regeneration, secondary air supplied from the air pump 50 flows through the NOx absorption and release material 34A at low speeds. Since the temperature of the exhaust gas flowing through the NOx absorption and release material is high due to combustion energy of the particulates, the NOx absorption and release material 34A releases absorbed NOx.

Then, at step 524A, flag C is set to "0", and then the routine proceeds to step 526 where the cycle ends. In the successive cycle, when the routine proceeds to step 510A, the routine will proceed from step 51A to step 526. As a result, the regeneration by steps 512A–524A of the previous cycle holds until the regeneration has been completed in the routines of FIGS. 14 and 15.

If it is determined at step 508 that passage A flag PAF is "0", this means valve 40a is currently shut so that the exhaust gas has been flowing through the passage 32B, and the NOx absorption and release material to be regenerated is the NOx absorption and release material 34B. Thus, the routine proceeds from step 508B to step 510B so that regeneration of the NOx absorption and release material 34B is executed. Structures and functions of steps 510B–524B are the same as those of steps 510A–524A except that suffix A of each reference numeral is changed to B.

The regeneration of the NOx absorption and release material 34A continues for a predetermined period according to the routine of FIG. 14. The routine of FIG. 14 is entered at step 600A at intervals of predetermined periods, for example, at every eight milliseconds. Then, at step 602A, a decision is made as to whether the timer count time exceeds a predetermined period T1 (for example, three minutes). If the timer count time exceeds the predetermined period T1 at step 602A, the routine proceeds to step 604A, where the relay 88 is switched off to switch off the heater 38A. Then, the routine proceeds to step 606A, where a decision is made as to whether the timer count time exceeds a predetermined period T2 (for example, fifteen minutes). If the timer count time exceeds the predetermined period T2, the routine proceeds to step 608A, where the air pump 50 and the air switching valve 48A are switched off, so that supply of secondary air stops. Then, the routine proceeds to step 612A, where a decision is made as to whether or not a timer count time exceeds a predetermined period T3 (for example, fifteen minutes). If the timer count time exceeds the period T3, the routine proceeds to step 614A, where the heater provided to the NOx decomposition catalyst 36A is switched off. In this way, when the period of the maximum of T1, T2, and T3 has elapsed, the regeneration is completed.

Then, at step 616A, a decision is made as to whether or not all of the relay 88, the air pump 50, the air switching valve 48A, and the heater 36A are switched off, that is, whether or not the regeneration has been completed. If the regeneration has not yet been completed, the routine proceeds to a return step 624A, and if the regeneration has been completed, the routine proceeds to steps 618A–622A, where passage A flag PAF is reset to "0", flag C is reset to "1", and the timer count time is cleared to zero.

Regeneration and resetting of the NOx absorption and release material 34B are executed according to a routine of FIG. 15 which is similar to that of FIG. 14. Steps 600B–624A of the routine of FIG. 15 correspond to steps 600A–624A of the routine of FIG. 14 except that suffix A is changed to suffice B. In the above-described structures, the routines of FIGS. 13, 14, and 15 constitute the NOx absorption and release material regeneration means of the third embodiment of the invention.

Operation of the third embodiment of the invention will now be explained.

When the pressure differential (Pa−Pb) between the pressures detected by the pressure sensors 92 and 94 exceeds the predetermined value Pd, it is assumed that the amount of diesel particulates captured by the NOx absorption and release material is large and it is a time for a regeneration cycle. Then, the flow switching valve 40A or 40B which has been open is switched to be closed and secondary air begins to be supplied into the passage where the now shut flow switching valve 40A, 40B is installed. Further, a corresponding heater 38A or 38B is switched to "ON" so that the diesel particulates which have been captured by the NOx absorption and release material are burned. The heater of the corresponding NOx decomposition catalyst 36A or 36B located downstream of the NOx absorption and release material is also switched on. When the temperature of the NOx absorption and release material 34A, 34B is high due to the thermal energy which the captured diesel particulates produces when burned, the NOx absorption and release material 34A, 34B releases absorbed NOx. The released NOx flows to the NOx decomposition catalyst 36A, 36B where the NOx is decomposed. Thus, the NOx absorption and release material 34A, 34B is regenerated not only as a captured diesel particulate filter and but also as an NOx absorption material. In the third embodiment, since flow through the NOx absorption and release material 34A, 34B during regeneration is at a low space velocity and at a high temperature, the regeneration is smooth. Consequently, one of the NOx absorption and release materials 34A, 34B is always in a non-saturated condition capable of absorbing NOx, so NOx exhaust to atmosphere is always prevented.

FOURTH EMBODIMENT

As illustrated in FIGS. 16–19, an apparatus according to the fourth embodiment of the invention comprises an apparatus where a reduction agent such as hydrocarbons (HC) and hydrogen is supplied into the passage upstream of the NOx decomposition catalyst 36A, 36B in an apparatus otherwise similar to that of the third embodiment, so that NOx conversion rate of the NOx decomposition catalyst 36A, 36B is increased. Since other structures and operation of the fourth embodiment of the invention are the same as those of the third embodiment of the invention, the same portions are denoted with the same reference numerals as those of the third embodiment, and portions different from the third embodiment only will be explained below.

Figure 16:
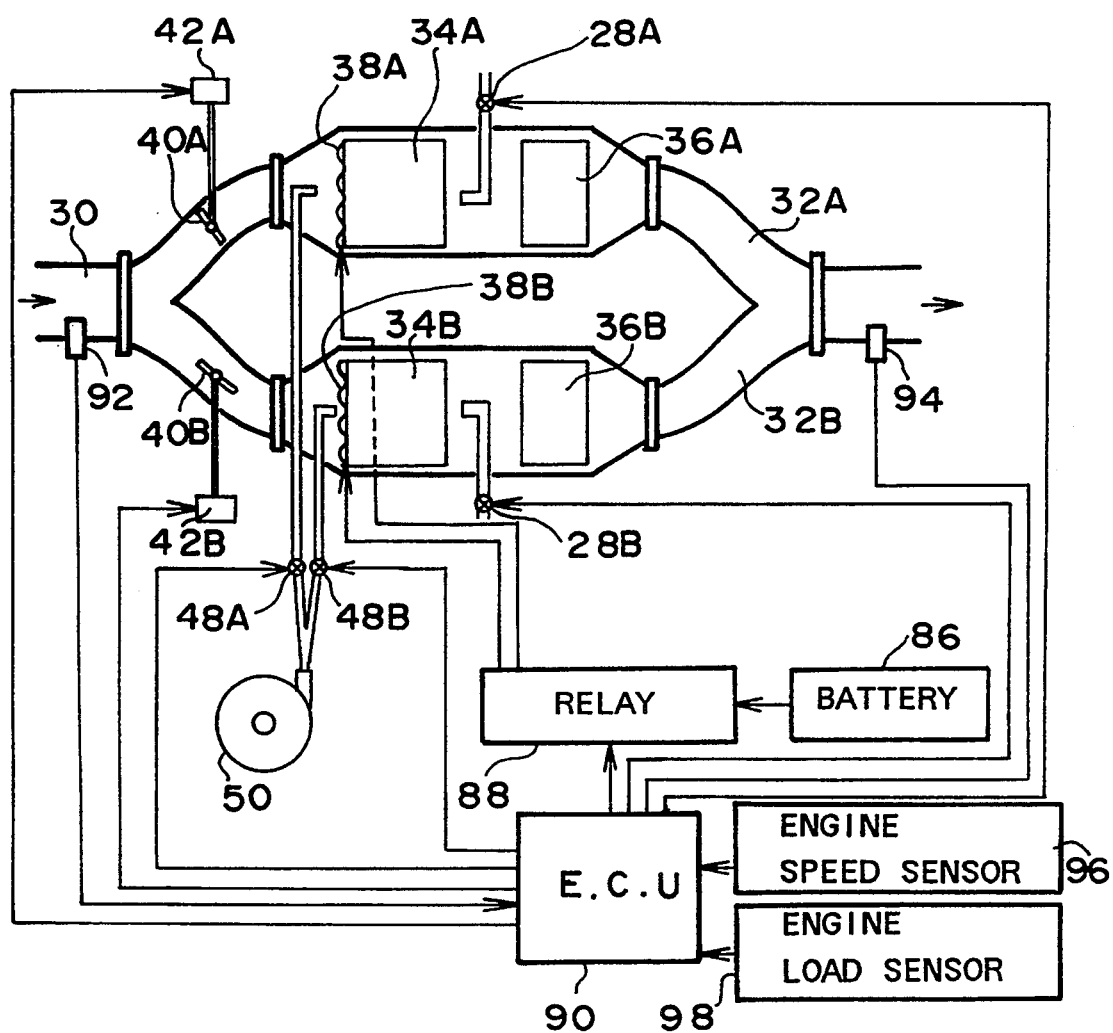
FIG. 16 is a schematic system diagram of an NOx decreasing apparatus for an internal combustion engine in accordance with a fourth embodiment of the invention.

In FIG. 16, between the NOx absorption and release material 34A, 34B and the NOx decomposition catalyst 36A, 36B, an HC injection apparatus for injecting fuel (light oil) of the diesel engine into the exhaust conduit is installed. The HC injection apparatus includes an HC supply valve 28A, 28B which supplies HC when it is open. Opening and closing of the HC supply valve 28A, 28B is controlled by the ECU 90.

FIGS. 17–19 illustrate routines for controlling regeneration of the NOx absorption and release materials 34A and 34B, which constitute the NOx absorption and release material regeneration means of the fourth embodiment of the invention. The routines of FIGS. 17–19 are the same as those of FIGS. 13–15, respectively, except that steps 700A, 700B, 702A, 704A, 702B, 704B are added in the routines of FIGS. 17–19.

More particularly, in FIG. 17, step 700A is added between step 522A and step 524A. At step 700A, HC supply valve 28A is opened so that HC is supplied. The NOx decomposition catalyst 36A, 36B needs HC as a reduction agent to decompose NOx. The supplied HC helps the released NOx to be decomposed at the NOx decomposition catalyst 36A. Similarly, step 700B is added between step 522B and 524B. At step 700B, HC supply valve 28B is opened so that HC is supplied. The supplied HC helps the released NOx to be decomposed at the NOx decomposition catalyst 36B.

When regeneration of the NOx absorption and release material 34A or 34B is completed, supply of HC is stopped. More particularly, in FIG. 18, steps 702A and 703A are added between step 614A and 616A. When the time counted by the timer exceeds a predetermined period T4 (for example, fifteen minutes), the HC supply valve 28A is switched off and supply of HC is stopped. Similarly, in FIG. 19, steps 702B and 704B are added and supply of HC is stopped by switching off the HC supply valve 28B.

With respect to operation of the fourth embodiment of the invention, the NOx conversion rate of the NOx decomposition catalysts 36A and 36B is increased to a great extent. More particularly, injected HC is thermally decomposed into HC of desirable sizes which is partially oxidized to generate radicals to promote decomposition of NOx at the NOx decomposition catalysts 36A and 36B.

The NOx absorption and release material 34A, 34B begins to release absorbed NOx not only when the exhaust gas temperature exceeds a predetermined temperature but also when the oxygen concentration of the exhaust gas lowers. When the air-fuel ratio is stoichiometric or rich, the exhaust gas includes almost no oxygen while unburned HC increases. The unburned HC is consumed in decomposing NOx, because the HC rapidly takes oxygen atoms from the NOx that is released from the NOx absorption and release material to be oxidized. Since the NOx absorption and release materials 34A and 34B have an NOx absorption characteristic under a lean burn condition and an NOx decomposition characteristic at low oxygen concentrations, the NOx decomposition catalysts 36A and 36B are not absolutely necessary in this embodiment.

In accordance with the present invention, since the heater operable to heat the NOx absorption and release material is provided, the temperature of the NOx absorption and release material can be intentionally controlled independently of the engine operating condition and the location of the NOx absorption and release material, so that controllability and freedom of design are improved.

Although only four embodiments of the invention have been described in detail above, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the present invention as defined by the following claims.

What is claimed is:

1. An NOx decreasing apparatus for an internal combustion engine comprising:
   an internal combustion engine capable of fuel combustion at lean air-fuel ratios;
   an exhaust conduit connected to the internal combustion engine;
   an NOx absorption and release material, installed in a first portion of the exhaust conduit, for absorbing NOx included in exhaust gas from the engine under oxidizing gas conditions at temperatures below a predetermined temperature and for releasing absorbed NOx at temperatures above the predetermined temperature; and
   a first heater installed in the first portion of the exhaust conduit and operable to heat the NOx absorption and release material to a temperature above the predetermined temperature.

2. An NOx decreasing apparatus according to claim 1, further comprising air-fuel ratio control means for decreasing an air-fuel ratio of the internal combustion engine from a lean ratio to at least a stoichiometric ratio when the NOx absorption and release material is releasing NOx.

3. An NOx decreasing apparatus according to claim 1, further comprising an NOx decomposition catalyst capable of decomposing NOx under oxidizing gas conditions and installed in the first portion of the exhaust conduit downstream of the NOx absorption and release material.

4. An NOx decreasing apparatus according to claim 1, further comprising:
   NOx absorption and release material regeneration means for temporarily operating the heater to heat the NOx absorption and release material to a temperature above the predetermined temperature to cause the NOx absorption and release material to release absorbed NOx.

5. An NOx decreasing apparatus according to claim 4, wherein the NOx absorption and release material comprises a composite oxide of alkaline earth and copper.

6. An NOx decreasing apparatus according to claim 5, wherein the composite oxide of alkali earth and copper is $MnO_2 \cdot BaCuO_2$.

7. An NOx decreasing apparatus according to claim 4, wherein the NOx absorption and release material comprises a combination of a rare-earth element and a noble metal.

8. An NOx decreasing apparatus according to claim 7, wherein the rare-earth element is lanthanum and the noble metal is platinum.

9. An NOx decreasing apparatus according to claim 4, further comprising:
   an NOx decomposition catalyst capable of decomposing NOx under oxidizing gas conditions and installed in the first portion of the exhaust conduit downstream of the NOx absorption and release material.

10. An NOx decreasing apparatus according to claim 9, wherein the NOx decomposition catalyst is a zeolite-type catalyst including zeolite and copper ion-exchanged and deposited onto the zeolite.

11. An NOx decreasing apparatus according to claim 9, wherein the NOx decomposition catalyst is a three-way catalyst.

12. An NOx decreasing apparatus according to claim 9, wherein the predetermined temperature above which the NOx absorption and release material releases NOx is about 500° C.

13. An NOx decreasing apparatus according to claim 9 wherein the exhaust conduit comprises:
   a bypass conduit bypassing the portion of the exhaust conduit where the NOx absorption and release material and the NOx decomposition catalyst are installed;
   a bypass valve installed at a connection point between the bypass conduit and the first portion of the exhaust conduit and operable to throttle exhaust gas flowing through the first portion of the exhaust conduit containing the NOx absorption and release material and the NOx decomposition catalyst, while allowing the remainder of the exhaust gas to flow through the bypass conduit; and
   bypass valve control means for controlling the bypass valve so that the bypass valve throttles the exhaust gas flowing through the NOx absorption and release material and the NOx decomposition catalyst while the NOx absorption and release material regeneration means is causing the heater to heat the NOx absorption and release material.

14. An NOx decreasing apparatus according to claim 13 wherein the NOx absorption and release material regeneration means comprises a timer which is switched on to begin to count time when an accumulated number of engine rotations exceeds a predetermined number and the exhaust gas temperature measured at an inlet of the NOx absorption and release material exceeds a predetermined temperature and which switches off the heater when the counted period of time exceeds a predetermined time period.

15. An NOx decreasing apparatus according to claim 14, wherein the predetermined time period set in the timer is about ten seconds.

16. An NOx decreasing apparatus according to claim 9 wherein the exhaust conduit comprises a single conduit, the first portion of the exhaust conduit containing the NOx absorption and release catalyst being located under a vehicle floor and the NOx decomposition catalyst comprising a three-way catalyst.

17. An NOx decreasing apparatus according to claim 16, further comprising:
   another three-way catalyst installed in the exhaust conduit between the internal combustion engine and the NOx absorption and release material.

18. An NOx decreasing apparatus according to claim 16 wherein the NOx absorption and release material regeneration means comprises:
   first decision means for determining whether or not a lean burn condition has continued for a first predetermined time period;
   second decision means for determining whether or not an exhaust gas temperature at the NOx absorption and release material is higher than the predetermined temperature;
   air-fuel ratio control means for temporarily reducing the air-fuel ratio of the engine to at least a stoichiometric ratio when the first decision means determines that a lean burn condition has continued for the first predetermined time period and the second decision means determines that the exhaust gas temperature is higher than the predetermined temperature; and
   a timer for counting time since the air-fuel ratio control means reduces the air-fuel ratio to at least a stoichiometric ratio, the timer switching off the heater and clearing the air-fuel ratio control means when the time counted by the timer exceeds a second predetermined time period.

19. An NOx decreasing apparatus according to claim 18, wherein the second predetermined time period is about twenty seconds.

20. An NOx decreasing apparatus according to claim 1, wherein the engine is a diesel engine, the exhaust conduit including a second portion parallel to the first portion, a second one of said NOx absorption and release material being disposed in the second portion of the exhaust conduit, the first and second NOx absorption and release materials operating also as diesel particulate filters, said first heater being disposed in the first portion of the exhaust conduit upstream of the first NOx absorption and release material and a second heater being disposed in the second portion of the exhaust conduit upstream of the second NOx absorption and release material.

21. An NOx decreasing apparatus according to claim 20, further comprising:
   a first flow switching valve disposed in the first portion of the exhaust conduit and a second flow switching valve disposed in the second portion of the exhaust conduit;
   a first secondary air supply port located in the first portion of the exhaust conduit between the first flow switching valve and the first NOx absorption and release material, and a second secondary air supply port located in the second portion of the exhaust conduit between the second flow switching valve and the second NOx absorption and release material;
   a first pressure sensor disposed in the exhaust conduit upstream of the first and second NOx absorption and release materials, and a second pressure sensor disposed in the second conduit downstream of the first and second NOx absorption and release materials; and
   NOx absorption and release material regeneration means for temporarily and alternately operating the first and second heaters to burn diesel particulates captured by the first and second NOx absorption and release materials and causing the first and second NOx absorption and release materials to release absorbed NOx.

22. An NOx decreasing apparatus according to claim 21, further comprising:
   a first NOx decomposition catalyst disposed in the first portion of the exhaust conduit downstream of the first NOx absorption and release material, and a second NOx decomposition catalyst disposed in the second portion of the exhaust conduit downstream of the second NOx absorption and release material.

23. An NOx decreasing apparatus according to claim 21, wherein said NOx absorption and release material regeneration means includes:
   a timer
   means for determining whether or not a difference between the outputs of the first and second pressure sensors exceeds a predetermined value;
   means for determining which one of the first and second portions of the exhaust conduit is currently open to exhaust gas flow; and
   means for closing the flow switching valve in the determined portion of the exhaust conduit, injecting secondary air into the determined portion, switching on the heater in the determined portion, and switching on the timer to cause the timer to count time.

24. An NOx decreasing apparatus according to claim 23, wherein said NOx absorption and release material regeneration means further includes:
   means for determining whether or not a time counted by the timer exceeds a first predetermined time period and switching off the heater when the counted time exceeds the first predetermined time; and
   means for determining whether or not a time counted by the timer exceeds a second predetermined time period and stopping the supply of secondary air when the counted time exceeds the second predetermined time.

25. An NOx decreasing apparatus according to claim 24, wherein the first time period is three minutes and the second time period is fifteen minutes.

26. An NOx decreasing apparatus according to claim 22, further comprising:
   a first HC supply port disposed in the first portion of the exhaust conduit between the first NOx absorption and release material and the first NOx decomposition catalyst, and a second HC supply port disposed in the second portion of the exhaust conduit between the second NOx absorption and release material and the second NOx decomposition catalyst.

27. An NOx decreasing apparatus according to claim 26, wherein said NOx absorption and release material regeneration means includes:
   means for supplying HC into one of the first and second portions of the exhaust conduit through one of the HC supply ports provided in the one of the first and second portions while one of the first and second NOx absorption and release materials installed in the one of the first and second portions is being regenerated so that supplied HC promotes reduction of NOx by one of the first and second NOx decomposition catalysts installed in the one of the first and second passages.

* * * * *

UNITED STATES PATENT AND TRADEMARK OFFICE
CERTIFICATE OF CORRECTION

PATENT NO. : 5,388,406
DATED : February 14, 1995
INVENTOR(S) : Takeshima, et al.

It is certified that error appears in the above-indentified patent and that said Letters Patent is hereby corrected as shown below:

On the title page, the "Related U.S. Application Data" should read

--Continuation of Ser. No. 967,599, Oct. 28, 1992, abandoned.--

Signed and Sealed this

Twenty-sixth Day of December, 1995

Attest:

BRUCE LEHMAN

*Attesting Officer*     *Commissioner of Patents and Trademarks*